US008031578B2

United States Patent
Obi et al.

(10) Patent No.: US 8,031,578 B2
(45) Date of Patent: Oct. 4, 2011

(54) MICROARRAY WITH ACTUATORS INSIDE AND OUTSIDE OF LIGHT-IRRADIATED REGION, AND OPTICAL HEAD DEVICE AND OPTICAL INFORMATION DEVICE INCORPORATING THE SAME

(75) Inventors: Hiroshi Obi, Nara (JP); Hironori Tomita, Nara (JP); Akira Kurozuka, Osaka (JP); Osamu Kajino, Osaka (JP)

(73) Assignee: Panasonic Corporation, Osaka (JP)

( * ) Notice: Subject to any disclaimer, the term of this patent is extended or adjusted under 35 U.S.C. 154(b) by 591 days.

(21) Appl. No.: 12/064,650

(22) PCT Filed: Aug. 25, 2006

(86) PCT No.: PCT/JP2006/316719
§ 371 (c)(1),
(2), (4) Date: Feb. 25, 2008

(87) PCT Pub. No.: WO2007/023940
PCT Pub. Date: Mar. 1, 2007

(65) Prior Publication Data
US 2009/0147636 A1 Jun. 11, 2009

(30) Foreign Application Priority Data
Aug. 26, 2005 (JP) ................. 2005-245605

(51) Int. Cl.
*G11B 7/00* (2006.01)
(52) U.S. Cl. ............... 369/112.29; 369/53.12
(58) Field of Classification Search .......... None
See application file for complete search history.

(56) References Cited

U.S. PATENT DOCUMENTS

| 5,535,047 | A | 7/1996 | Hornbeck |
| 6,430,137 | B1 | 8/2002 | Saimi et al. |
| 6,906,848 | B2 * | 6/2005 | Aubuchon ............ 359/291 |
| 7,570,552 | B2 * | 8/2009 | Iwasaki et al. ......... 369/44.32 |
| 2002/0101646 | A1 | 8/2002 | Ide et al. |
| 2004/0061917 | A1 * | 4/2004 | Mushika et al. .......... 359/223 |
| 2005/0152019 | A1 | 7/2005 | Mushika |
| 2006/0109538 | A1 | 5/2006 | Mushika et al. |
| 2007/0159025 | A1 | 7/2007 | Mushika |

FOREIGN PATENT DOCUMENTS

EP 1564181 A1 * 8/2005
(Continued)

OTHER PUBLICATIONS

International Search Report for corresponding Application No. PCT/JP2006/316719 dated Sep. 26, 2006.
(Continued)

*Primary Examiner* — Paul Huber
(74) *Attorney, Agent, or Firm* — Renner, Otto, Boisselle & Sklar, LLP

(57) ABSTRACT

An optical head device according to the present invention includes: a light source for outputting laser light; an optical system for allowing the laser light to be radiated onto an optical disk medium; and an aberration correction section for correcting an aberration of the laser light. The aberration correction section includes: a plurality of mirror sections for reflecting the laser light; a plurality of mirror driving sections for displacing the plurality of mirror sections; and a detection section for detecting a physical condition within the optical head device.

26 Claims, 20 Drawing Sheets

FOREIGN PATENT DOCUMENTS

| | | |
|---|---|---|
| JP | 08-334709 | 12/1996 |
| JP | 2000-155979 | 6/2000 |
| JP | 2002-228813 | 8/2002 |
| JP | 2002-288873 | 10/2002 |
| JP | 2002-355798 | 12/2002 |
| JP | 2003-198943 | 7/2003 |
| JP | 2003-255244 | 9/2003 |
| JP | 2004-063518 | 2/2004 |
| JP | 2004-279935 | 10/2004 |
| JP | 2005/085125 | 9/2005 |
| WO | 03/065103 | 8/2003 |
| WO | 2004/041710 | 5/2004 |
| WO | 2005/085125 | 9/2005 |

OTHER PUBLICATIONS

DeHennis et al.; "An All-Capacitive Sensing Chip for Temperature, Absolute Pressure, and Relative Humidity"; IEEE 12$^{th}$ International Conference on Solid-State Sensors, Actuators and Microsystems, Boston, MA; Jun. 2003.

* cited by examiner

FIG.10C
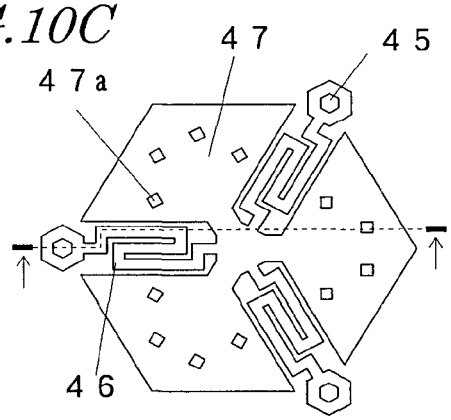
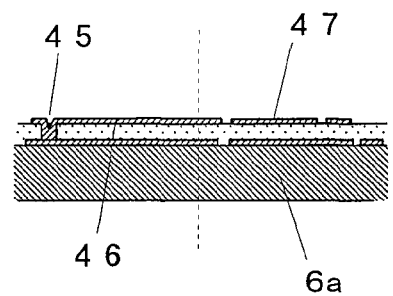
FIG.10D
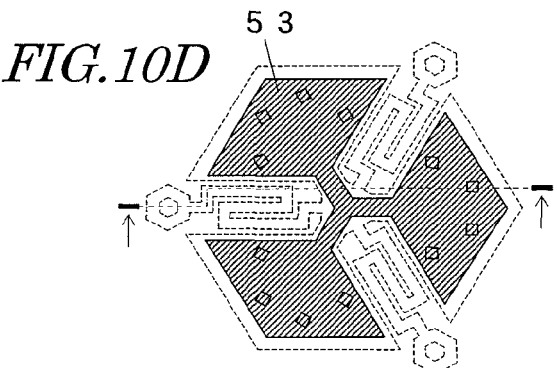
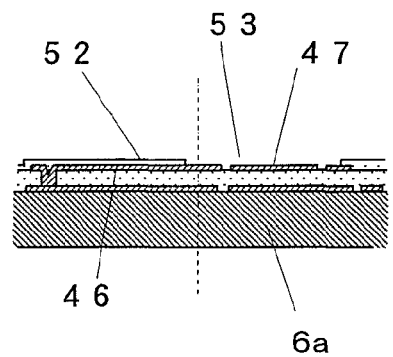
FIG.10E
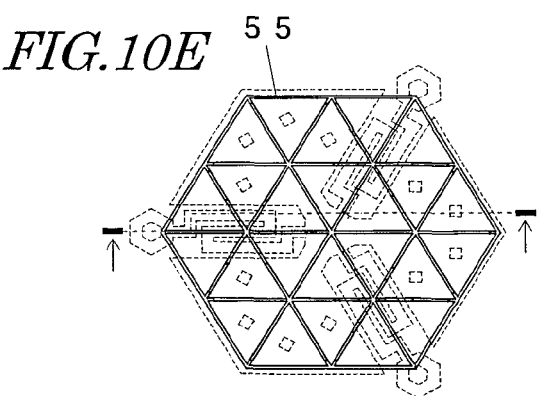
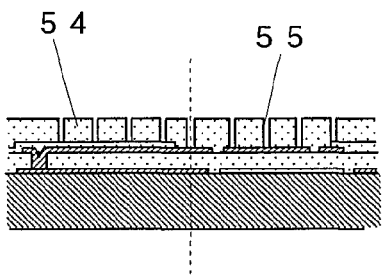
FIG.10F
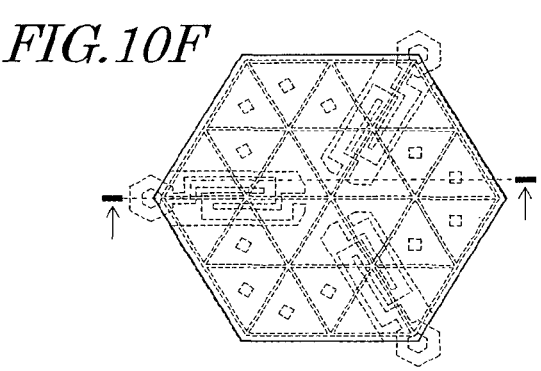
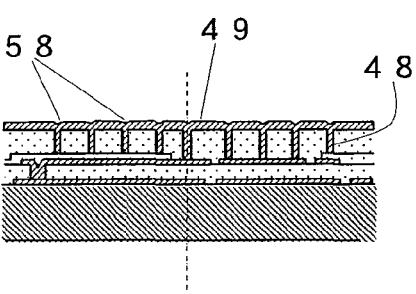

*FIG.10G*
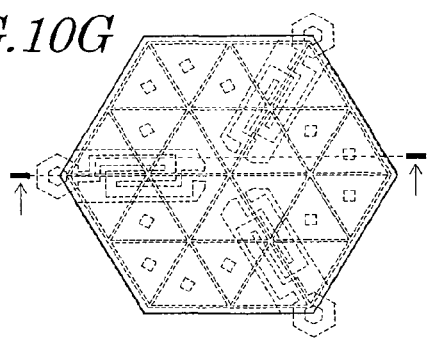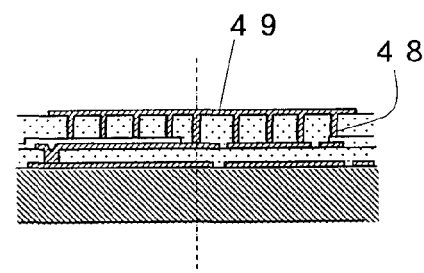
*FIG.10H*
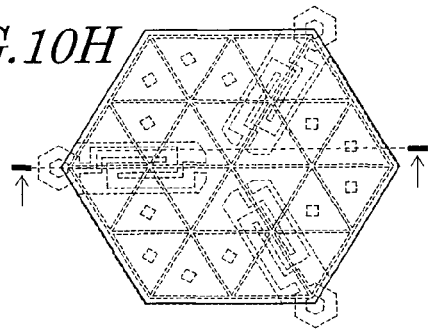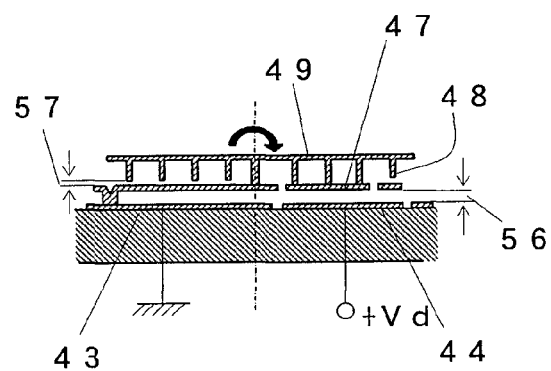

FIG. 11
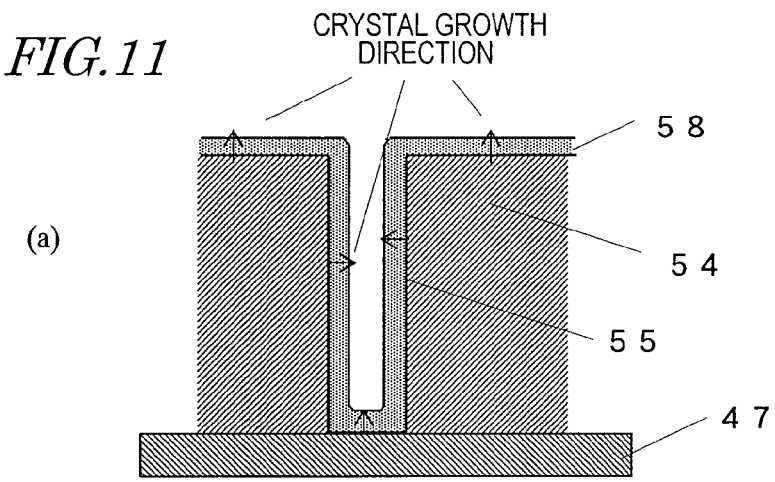
(a)
(b)
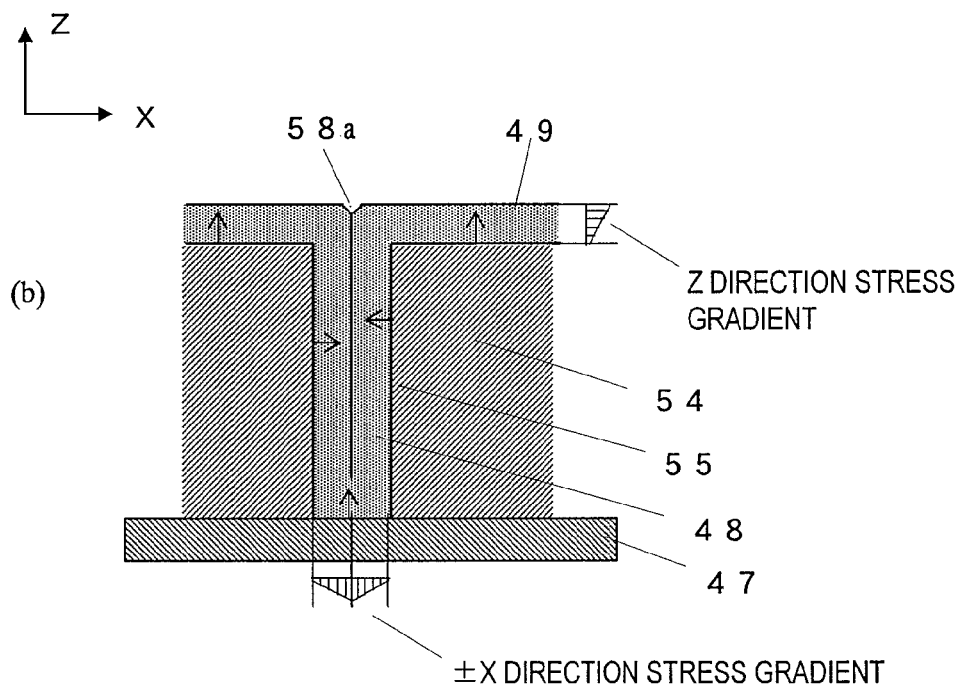
±X DIRECTION STRESS GRADIENT
FIG. 12A
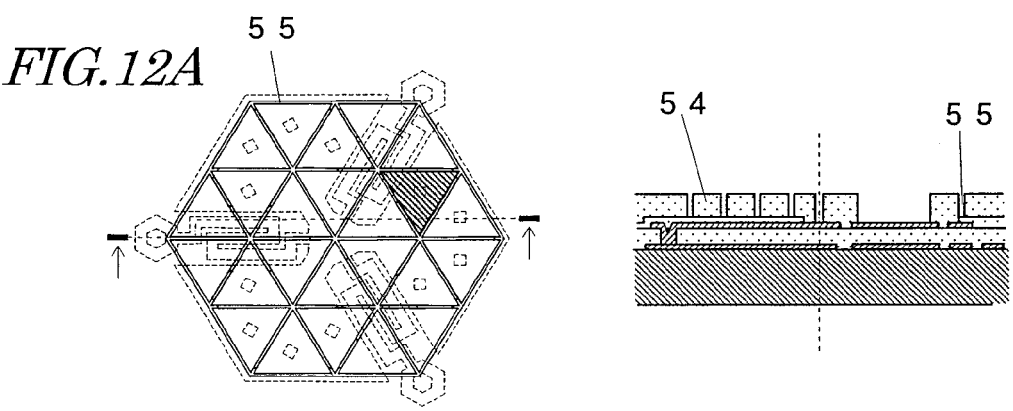

FIG.12B
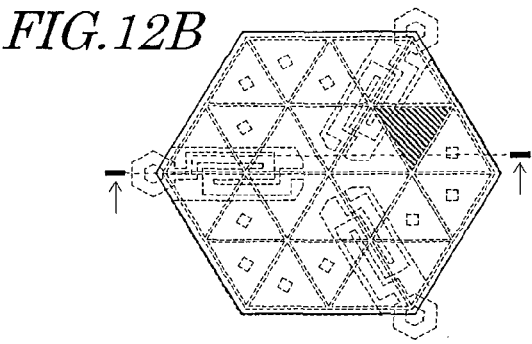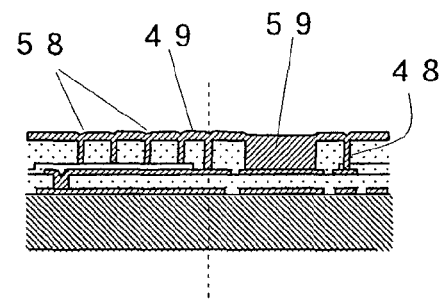
FIG.12C
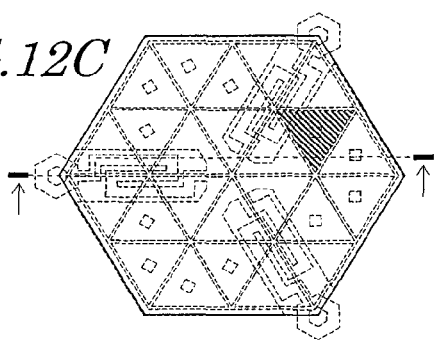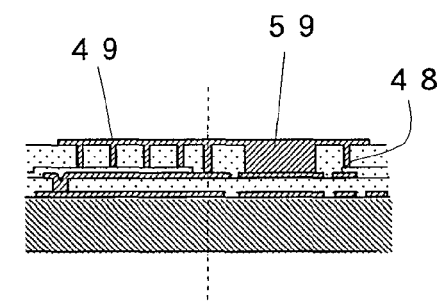
FIG.12D
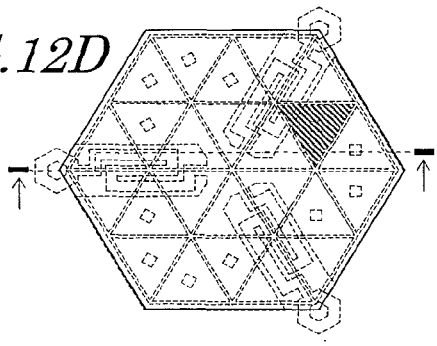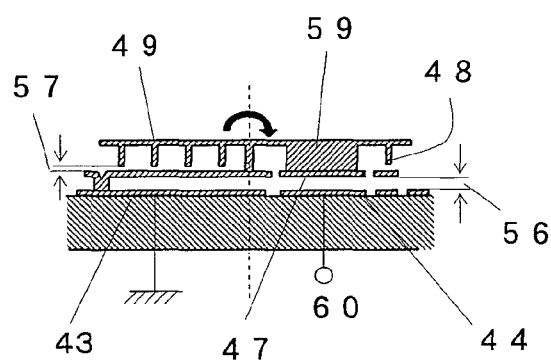

*FIG.14A* 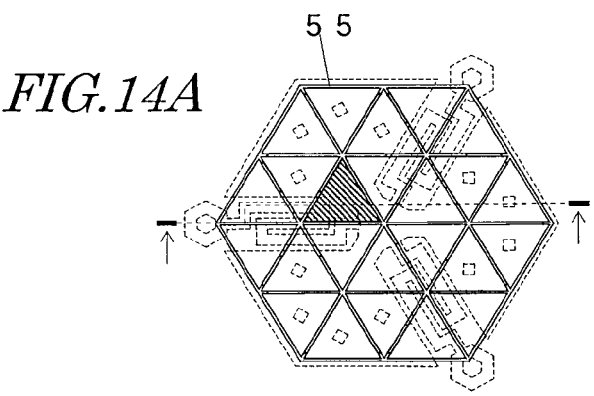 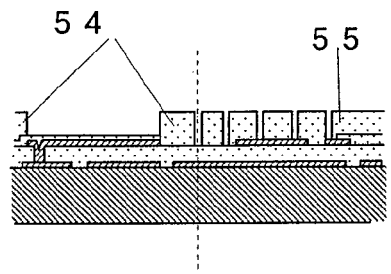
*FIG.14B* 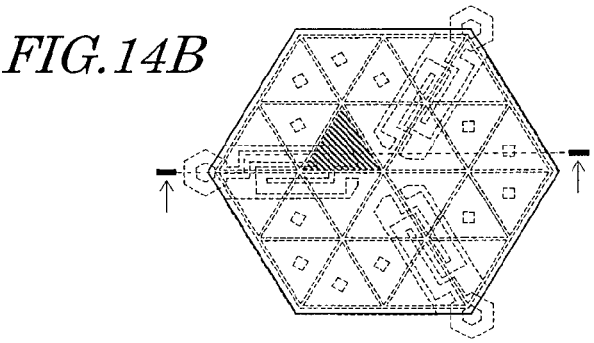 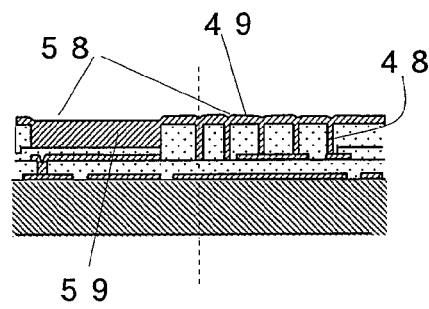
*FIG.14C* 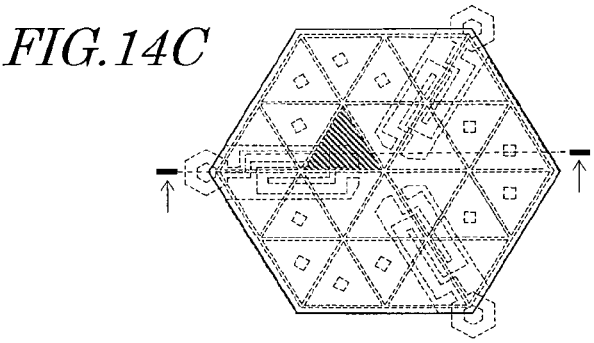 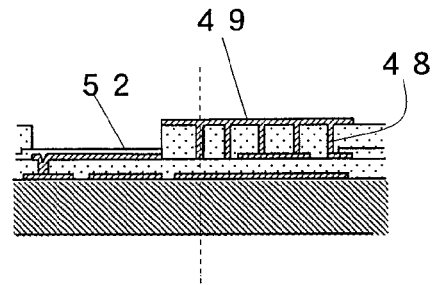
*FIG.14D* 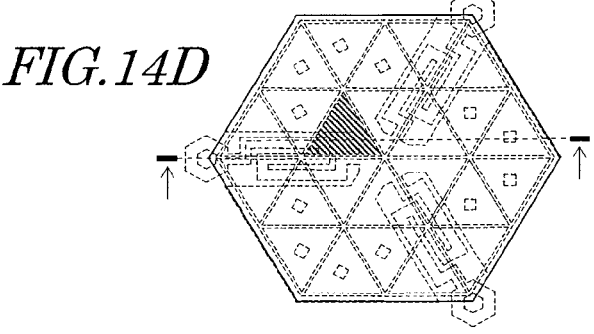 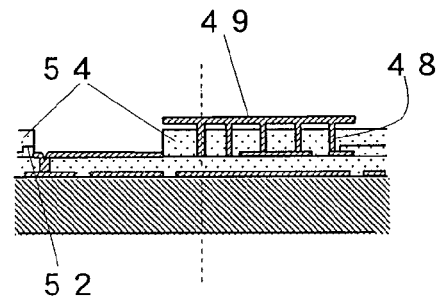

FIG.14E
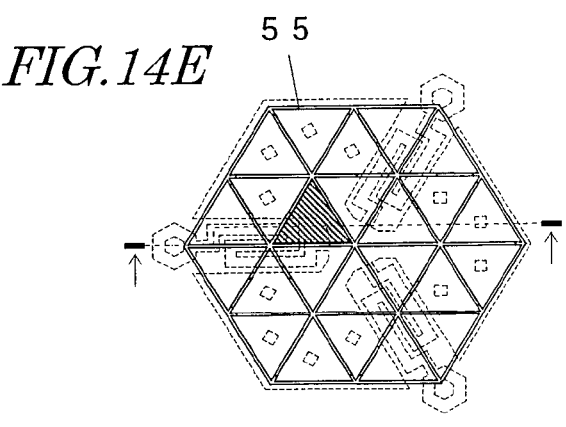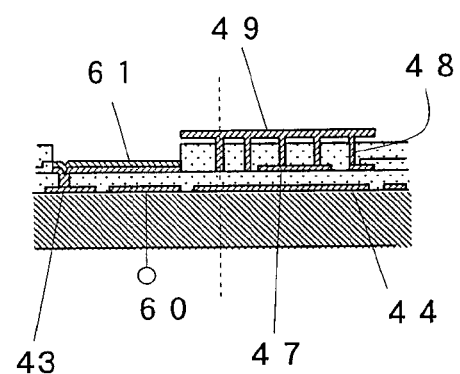
FIG.14F
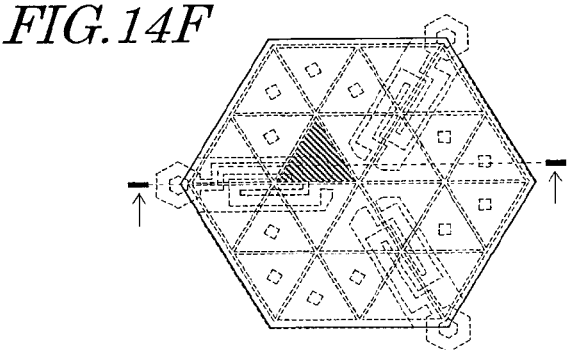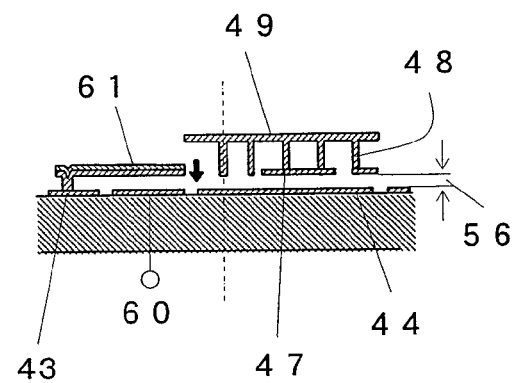

MICROARRAY WITH ACTUATORS INSIDE AND OUTSIDE OF LIGHT-IRRADIATED REGION, AND OPTICAL HEAD DEVICE AND OPTICAL INFORMATION DEVICE INCORPORATING THE SAME

This application is a 371 of PCT/JP2006/316719, filed Aug. 25, 2006.

TECHNICAL FIELD

The present invention relates to an apparatus which performs optical recording and/or reproduction of information, and more particularly to an apparatus having an aberration correcting device.

BACKGROUND ART

The optical memory technology which involves use of an optical disk medium having a pit pattern as a high-density and large-capacity information storage medium is being put to practical use, with its purposes being expanded to digital audio disks, video disks, text file disks, and further to data file disks. The functions which are necessary for using a finely-focused laser light to successfully perform recording of information onto an optical disk medium and reproduction of information from an optical disk medium in a highly reliable manner are generally classified into: a convergence function of forming a diffraction-limited light spot; a focus control (focusing servo) function for an optical system and a tracking control (tracking servo) function; and a pit signal (information signal) detection function.

In order to further enhance the recording density of an optical disk medium, the numerical aperture NA of an objective lens to be mounted in an optical head is on the increase and the wavelength λ of light from a light source is on the decrease, whereby the spot diameter of light which is converged by the objective lens is being reduced. Moreover, in order to further increase the recording capacity of an optical disk medium, there has been a trend to provide in an optical disk medium a plurality of recording layers for recording information.

For example, according to the CD (Compact Disc) standard, the numerical aperture NA of an objective lens is 0.45 and the wavelength of light from a light source is 780 nm. On the other hand, according to the DVD (Digital Versatile Disc) standard, which is adapted for a higher recording density and a larger capacity, the numerical aperture NA is 0.6 and the light wavelength is 650 nm.

By the way, an aberration which occurs due to a tilt of an optical disk medium with respect to the optical axis increases as the wavelength of light becomes shorter. Therefore, in order to employ a shorter-wavelength light source and still obtain a good light spot, it is effective to reduce the base thickness (i.e., a distance from a light-entering surface of an optical disk medium to a recording layer) in a manner to cancel such an aberration. Thus, the base thickness is 1.2 mm for the CD, but is 0.6 mm for the DVD.

Moreover, according to the BD (Blu-ray Disc) standard, which uses blue laser light, the numerical aperture NA is 0.85, and the base thickness is 0.1 mm.

A spherical aberration which is ascribable to the base thickness protecting a recording layer of an optical disk medium is in proportion with the fourth power of the numerical aperture NA. Therefore, when setting a large numerical aperture NA of 0.85, as in the case of the BD standard, a means for correcting spherical aberration is provided in the optical system.

Conventionally, a technique has been proposed which detects a specific type of aberration from the output signal of an optical pickup device and corrects the aberration. There are transmission-type aberration correcting devices using liquid crystal devices, as well as reflection-type aberration correcting devices which drive thin film mirrors or arrayed micromirrors, as are disclosed in Patent Document 1 and Patent Document 2.

Furthermore, although the market demand for downsizing of electronic devices is only increasing, progresses in semiconductor micromachining technology have facilitated the fabrication of micro structures such as aberration correcting devices. In the recent years, this technology is referred to as the micromachining technology, and there is a great deal of research and development directed to microactuators to which this technology is applied. One instance of an actual product of this is an acceleration sensor of a capacitance detection-type. Another instance is a spatial light modulation apparatus disclosed in Patent Document 3. This has been developed as an image displaying device for a video projector, and is known by the name of DMD (Digital Micromirror Device). Although this microactuator uses electrostatic attraction as its driving method, other examples would be electromagnetic force, thermal stress, optical pulling force, and the like.

A driving method which is used particularly frequently is electrostatic attraction. This method has an advantage in that it is capable of minimizing the driving voltage with a low power consumption, while also realizing a high response speed.

Furthermore, Patent Document 4 discloses a deformable mirror which, on the strength of the fact that electrostatic attraction is utilized as its driving force, realizes a displacement detection function of detecting its own displacement based on changes in capacitance.

Moreover, Non-patent Document 1 discloses a chip on which a temperature sensor, a pressure sensor, and a humidity sensor are collectively mounted. Each of these sensors is designed individually in accordance with the subject of detection, such that a different material is used for each sensor, each sensor being produced on its own.

[Patent Document 1] Japanese Laid-Open Patent Publication No. 2000-155979

[Patent Document 2] Japanese Laid-Open Patent Publication No. 2002-288873

[Patent Document 3] Japanese Laid-Open Patent Publication No. 8-334709

[Patent Document 4] Japanese Laid-Open Patent Publication No. 2002-228813

[Non-patent Document 1] "AN ALL-CAPACITIVE SENSING CHIP FOR TEMPERATURE, ABSOLUTE PRESSURE, AND RELATIVE HUMIDITY", IEEE 12th International Conference on Solid-State Sensors, Actuators and Microsystems, Boston, Mass., June 2003

DISCLOSURE OF INVENTION

Problems to be Solved by the Invention

In order to realize stable operation of an optical head device, it is desirable to detect changes in physical conditions within the optical head device (temperature, humidity, acceleration, etc.), and perform feedback control for each component element in the optical head device in accordance with such changes. For example, it is desirable to subject a laser light source and a photodetector to feedback control in accordance with changes in temperature and humidity, and it is desirable to subject an objective lens driving mechanism and a traverse mechanism to feedback control in accordance with changes in temperature and acceleration.

In order to detect such temperature, humidity, and acceleration, physical condition detectors such as a temperature sensor, a humidity sensor, and an acceleration sensor are mounted on the optical head device. However, mounting such sensors on the optical head device would result in a problem of the optical head device becoming large in size.

The present invention has been made in view of the aforementioned problem, and an objective thereof is to provide an optical head device which includes a detection section for detecting a physical condition(s) within the apparatus and yet realizes downsizing, as well as an optical information apparatus in which such an optical head device is mounted.

Means for Solving the Problems

An actuator according to the present invention is an actuator having an optical modulation section for modulating light, and is characterized in that the optical modulation section comprises: a base; a movable section having a light reflecting surface and being capable of displacement relative to the base; an elastic supporting member for supporting the movable section; a stationary electrode portion formed on the base so as to oppose the movable section; and a detection section for detecting a physical condition to which the actuator is subjected.

In one embodiment, the detection section is the movable section and the stationary electrode portion; and the physical condition is detected from an amount of displacement between the movable section and the stationary electrode portion.

In one embodiment, the physical condition is at least one of temperature, humidity, acceleration, angular velocity, angular acceleration, and pressure.

In one embodiment, the detection section is an acceleration sensor which is produced through a same process as a production process of the optical modulation section.

In one embodiment, the movable section is displaced by an electrostatic attraction occurring between the movable section and the stationary electrode.

In one embodiment, the detection section is disposed in at least a portion of the optical modulation section.

In one embodiment, the detection section is disposed in at least a portion of an outer periphery of the optical modulation section.

A production method according to the present invention is a method for producing an actuator in which an electrostatic attraction occurring between a movable electrode and a stationary electrode causes displacement of the movable section, and is characterized by comprising: a step of forming the stationary electrode on a base; a step of depositing a first sacrificial layer on the stationary electrode, and forming the movable electrode on the first sacrificial layer; a step of depositing a second sacrificial layer on the movable electrode; a step of, when forming in the second sacrificial layer a trench in which to deposit a material for forming a rib connecting the movable electrode to a mirror section, forming the trench so as to have a broader width in a portion than in other portions; and a step of depositing the material in the trench to form the rib and forming a weight in the portion having a broad width.

An optical head device according to the present invention is an optical head device comprising: a light source for outputting laser light; an optical system for allowing the laser light to be radiated onto an optical disk medium; and an aberration correction section for correcting an aberration of the laser light, and is characterized in that the aberration correction section includes: a plurality of mirror sections for reflecting the laser light; a plurality of mirror driving sections for displacing the plurality of mirror sections; and a detection section for detecting a physical condition within the optical head device.

In one embodiment, the detection section is at least one mirror driving section among the plurality of mirror driving sections.

In one embodiment, a driving signal generation section for generating a predetermined driving signal which is in accordance with the detected physical condition is further comprised.

In one embodiment, the physical condition is at least one of temperature, humidity, acceleration, angular velocity, angular acceleration, and pressure.

In one embodiment, by time division, the at least one mirror driving section switches between an operation of driving the at least one mirror section for aberration correction and an operation of detecting the physical condition.

In one embodiment, the mirror driving section includes a movable electrode portion and a stationary electrode portion which are apart from each other via a gap; and the mirror driving section causes the mirror section to be displaced by an electrostatic attraction occurring between the movable electrode and the stationary electrode.

In one embodiment, the mirror driving section includes a piezoelectric element; and the mirror section is displaced in accordance with a deformation of the piezoelectric element.

In one embodiment, the detection section is an acceleration sensor which is produced through a same process as a production process of the mirror driving section.

In one embodiment, the acceleration sensor includes a movable electrode portion and a stationary electrode portion which are apart from each other via a gap; and a distance between the movable electrode and the stationary electrode changes in accordance with an acceleration experienced by the optical head device.

In one embodiment, the aberration correction section includes: a base; a movable section having a light reflecting surface and being capable of displacement relative to the base; an elastic supporting member for supporting the movable section; and a stationary electrode portion formed on the base so as to oppose the movable section.

In one embodiment, the aberration correction section includes: a base; a movable section having a light reflecting surface and being capable of displacement relative to the base; an elastic supporting member for supporting the movable section; and a piezoelectric member for displacing the movable section.

An optical information apparatus according to the present invention is characterized by comprising: the aforementioned optical head device; a light source driving section for driving the light source; an objective lens mechanism driving section for driving an objective lens mechanism which controls a position of an objective lens included in the optical system; a traverse mechanism driving section for driving a traverse mechanism for transporting the optical head device along a radial direction of the optical disk medium; a rotation mechanism driving section for driving a rotation mechanism which rotates the optical disk medium; and a driving signal generation section for generating, in accordance with the detected physical condition, a driving signal for driving at least one of the light source driving section, the objective lens mechanism driving section, the traverse mechanism driving section, and the rotation mechanism driving section.

In one embodiment, the detection section is an acceleration sensor which is produced through a same process as a production process of the mirror driving section.

An optical information apparatus according to the present invention is an optical information apparatus comprising the aforementioned optical head device, and is characterized in that the optical information apparatus further comprises at least one of: a tilt mechanism driving section for driving a tilt mechanism for tilting at least one of an objective lens included in the optical system and the optical disk medium; an optical element mechanism driving section for driving an optical element mechanism for controlling a position of an optical element disposed in an optical path of the optical system; a collision prevention mechanism driving section for driving a collision prevention mechanism for preventing the objective lens from colliding against the optical disk medium; a loading mechanism driving section for driving a loading mechanism for loading the optical disk medium; and a cooling fan driving section for driving a cooling fan; and the optical information apparatus further comprises: a driving signal generation section for generating, in accordance with the detected physical condition, a driving signal for driving at least one of the tilt mechanism driving section, the optical element mechanism driving section, the collision prevention mechanism driving section, the loading mechanism driving section, and the cooling fan driving section.

In one embodiment, the detection section is an acceleration sensor which is produced through a same process as a production process of the mirror driving section.

An actuator according to the present invention is an actuator having an optical modulation section for modulating light, and is characterized in that the optical modulation section comprises: a base; a movable section having a light reflecting surface and being capable of displacement relative to the base; an elastic supporting member for supporting the movable section; a piezoelectric member for displacing the movable section; and a detection section for detecting a physical condition to which the actuator is subjected.

In one embodiment, the detection section is the piezoelectric member; and the physical condition is detected from a strain of the piezoelectric member.

In one embodiment, the physical condition is at least one of temperature, humidity, acceleration, angular velocity, angular acceleration, and pressure.

In one embodiment, the detection section is an acceleration sensor which is produced through a same process as a production process of the optical modulation section.

In one embodiment, the movable section is displaced by an electrostatic attraction occurring between the movable section and the stationary electrode.

In one embodiment, the detection section is disposed in at least a portion of an outer periphery of the optical modulation section.

A production method according to the present invention is a method for producing an actuator in which an electrostatic attraction occurring between a movable electrode and a stationary electrode causes displacement of the movable section, comprising: a step of forming the stationary electrode on a base; a step of depositing a sacrificial layer on the stationary electrode; a step of forming an elastic supporting member for supporting the movable electrode and the movable electrode on the sacrificial layer; and a step of forming a bimetal structure by depositing, on at least one of the movable electrode and the elastic supporting member, a material which is different from a material or materials of the movable electrode and the elastic supporting member.

Effects of the Invention

According to the present invention, an aberration correction section includes a detection section(s) for detecting a physical condition(s) within an optical head device. Since the aberration correction section detects the physical condition(s), it is unnecessary to mount any separate detection sections, whereby downsizing, simplification, and cost reduction can be realized in the optical head device. Moreover, the driving signal generation section generates a driving signal in accordance with the detected physical condition(s). As a result, the operation of each component element of an optical information apparatus can be controlled in accordance with the detected physical condition(s).

BRIEF DESCRIPTION OF DRAWINGS

FIG. 10C A diagram showing a production method for an aberration correcting device according to an embodiment of the present invention.

FIG. 10D A diagram showing a production method for an aberration correcting device according to an embodiment of the present invention.

FIG. 10E A diagram showing a production method for an aberration correcting device according to an embodiment of the present invention.

FIG. 10F A diagram showing a production method for an aberration correcting device according to an embodiment of the present invention.

FIG. 10G A diagram showing a production method for an aberration correcting device according to an embodiment of the present invention.

FIG. 10H A diagram showing a production method for an aberration correcting device according to an embodiment of the present invention.

FIG. 11 An enlarged view of a trench portion of an aberration correcting device according to an embodiment of the present invention.

FIG. 12A A diagram showing a production method for an aberration correcting device having an acceleration sensor according to an embodiment of the present invention.

FIG. 12B A diagram showing a production method for an aberration correcting device having an acceleration sensor according to an embodiment of the present invention.

FIG. 12C A diagram showing a production method for an aberration correcting device having an acceleration sensor according to an embodiment of the present invention.

FIG. 12D A diagram showing a production method for an aberration correcting device having an acceleration sensor according to an embodiment of the present invention.

FIG. 14A A diagram showing a production method for an aberration correcting device having a temperature sensor according to an embodiment of the present invention.

FIG. 14B A diagram showing a production method for an aberration correcting device having a temperature sensor according to an embodiment of the present invention.

FIG. 14C A diagram showing a production method for an aberration correcting device having a temperature sensor according to an embodiment of the present invention.

FIG. 14D A diagram showing a production method for an aberration correcting device having a temperature sensor according to an embodiment of the present invention.

FIG. 14E A diagram showing a production method for an aberration correcting device having a temperature sensor according to an embodiment of the present invention.

FIG. 14F A diagram showing a production method for an aberration correcting device having a temperature sensor according to an embodiment of the present invention.

Figure 1:
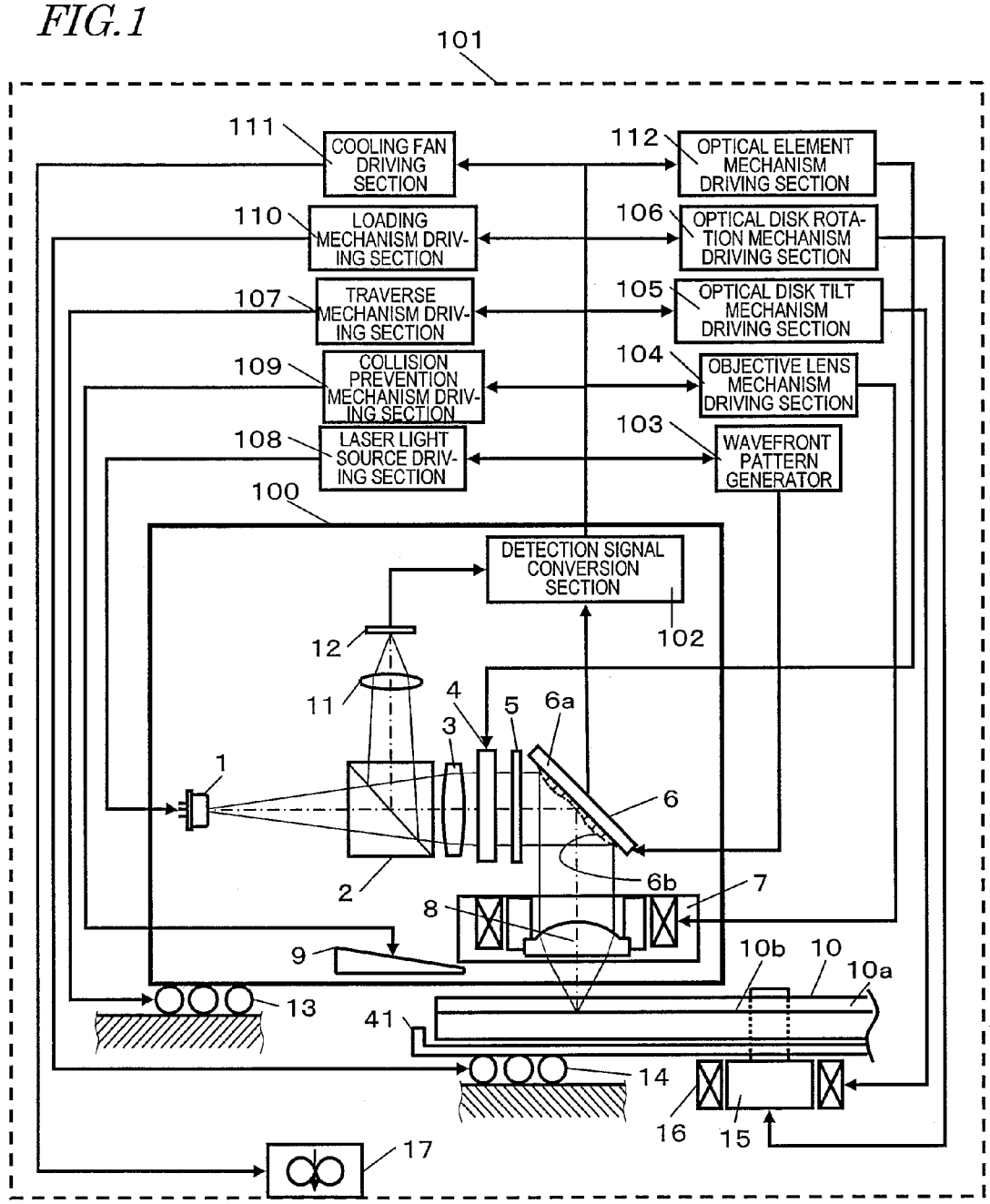
FIG. 1 A diagram showing an optical information apparatus according to an embodiment of the present invention.

DESCRIPTION OF THE REFERENCE NUMERALS 1 laser light source
2 polarization beam splitter
3 collimating lens
4 beam expander
5 ¼ wavelength plate
6 aberration correcting device
6a base
6b micromirror
7 objective lens driving mechanism
8 objective lens
9 collision prevention mechanism
10 optical disk medium
11 detection lens
12 photodetector
13 traverse mechanism
14 loading mechanism
15 optical disk medium rotation mechanism
16 optical disk medium tilt mechanism
17 cooling fan
18 laser-light irradiated region
19 displacement detection member
20,22,23,26,30,32,32a,32b,35 aluminum layer
21,25,28,31,33,36,37 silicon
24 polymer film
27 quartz crystal structure
29 oxide film layer
34 electrostatic attraction
38 piezoelectric element
39 microphone
40 transmitter
41 disk tray
42 base
43 ground electrode
44 stationary electrode
45 support post
46 elastic supporting member
47 movable electrode
47a etching hole
47b vertical rib connecting portion
48 vertical rib
48a recess
49 mirror face
50,52,54 sacrificial layer
51,53 via
55 trench
56,57 gap
58 metal layer
59 weight
60 detection electrode
61 cantilever
100 optical head
101 optical information apparatus
102 detection signal conversion section
103 wavefront pattern generator
104 objective lens driving mechanism driver
105 optical disk medium tilt mechanism driving section
106 optical disk medium rotation mechanism driving section
107 traverse mechanism driving section
108 laser light source driving section
109 collision prevention mechanism driving section
110 loading mechanism driving section
111 cooling fan driving section
112 optical element driving mechanism driver
C capacitance
ω angular velocity

BEST MODE FOR CARRYING OUT THE INVENTION

Hereinafter, embodiments of the present invention will be described with reference to the drawings.

Embodiment 1

FIG. 1 is a diagram showing an optical information apparatus 101 according to the present embodiment.

The optical information apparatus 101 includes an optical head device 100, the optical head device 100 having a laser light source 1 for outputting laser light and an aberration correcting device 6 for correcting an aberration of the laser light 1. The aberration correcting device 6 includes a detection section(s) for detecting physical a physical condition(s) within the optical head device 100. Since the aberration correcting device 6 detects a physical condition(s), the optical head device 100 does not need to have any separate detection sections mounted therein. The details of the aberration correcting device 6 will be described later.

The optical information apparatus 101 further includes a traverse mechanism 13, a loading mechanism 14, an optical disk medium rotation mechanism 15, an optical disk medium tilt mechanism 16, and a cooling fan 17. Moreover, the optical information apparatus 101 further includes a wavefront pattern generator 103, an objective lens driving mechanism driving section 104, an optical disk medium tilt mechanism driving section 105, an optical disk medium rotation mechanism driving section 106, a traverse mechanism driving section 107, a laser light source driving section 108, a collision prevention mechanism driving section 109, a loading mechanism driving section 110, a cooling fan driving section 111, and an optical element driving mechanism driving section 112. Driving of these driving sections is controlled by driving signals which are generated by the detection signal conversion section in accordance with the detected physical conditions.

The optical head device 100 further includes a polarization beam splitter 2, a collimating lens 3, a beam expander 4, a ¼ wavelength plate 5, an objective lens driving mechanism 7, an objective lens 8, a collision prevention mechanism 9, a detection lens 11, a photodetector 12, and a detection signal conversion section 102. The polarization beam splitter 2, the collimating lens 3, the beam expander 4, the ¼ wavelength plate 5, and the objective lens 8 are an optical system for allowing laser light to be radiated onto an optical disk medium 10.

Next, an operation of the optical information apparatus 101 will be described. Laser light which is output from the laser light source 1 travels through the polarization beam splitter 2, the collimating lens 3, and the ¼ wavelength plate 5 so as to be reflected by the aberration correcting device 6, and converged by the objective lens 8. The laser light having been converged by the objective lens 8 is transmitted through a cover layer 10a of the optical disk medium 10 and forms a spot on a recording layer 10b. The reflected light having been reflected from the optical disk medium 10 follows the opposite path to be reflected by the polarization beam splitter 2, and enters the photodetector 12 via the detection lens 11. From the received reflected light, the photodetector 12 generates a reproduction signal and servo signals for focusing and tracking. The objective lens driving section 104 subjects the servo signals to calculation processes for driving the objective lens driving mechanism 7, thus performing focusing and tracking servo for the objective lens 8. Moreover, through control by an optical disk tilt mechanism driving section, the objective lens driving mechanism 7 is also able to function as a tilt mechanism for tilting the objective lens 8.

The wavelength of the laser light which is output from the light source 1 is a wavelength corresponding to the BD (405 nm), for example. A spherical aberration occurs due to differences in the distance from the light-entering surface to the recording layer 10b (i.e., base thickness) of the optical disk medium 10 which is loaded in the optical information apparatus 101, a chromatic aberration occurring in the optical system, and the like. However, the wavefront pattern generator 103 generates a wavefront pattern for canceling this, and the aberration correcting device 6 is driven to effect an aberration correction, whereby a beam spot which is suited to recording or reproduction is formed.

The driving section for the aberration correcting device 6 is also partly a displacement detector(s). An amount(s) of displacement acquired from a displacement detection member(s) is used for the feedback control of at least one of the component elements of the optical information apparatus 101.

Moreover, the amount of displacement(s) is used for the feedback control of the wavefront pattern generator 103. The wavefront pattern generator 103 is a driving section which generates a correction wavefront on micromirrors 6b of the aberration correcting device 6 in order to correct a wave aberration which occurs in the optical information apparatus 101. The micromirror 6b functions as an optical modulation section for modulating light.

The aberration correcting device 6 includes a base 6a, and is a micromirror array in which micromirrors 6b (which are mirror devices) are arranged in a two-dimensional manner on the base 6a. Each micromirror is independently controlled with respect to its up-down positioning relative to the base and with respect to its tilt, such that an arbitrary wavefront can be formed. Such a micromirror array is produced on a silicon substrate by micromachining technology in semiconductor fabrication processes. For example, techniques which are disclosed in Japanese Patent Application No. 2003-564638 and Japanese Patent Application No. 2004-063518, which is Patent Document 6, are suitable.

In the case where the optical disk medium 10 includes a plurality of recording layers, the distance (base thickness) from the disk surface to the recording layer will differ depending on the recording layer selected. Therefore, the aberration correcting device 6 is driven in a similar manner to correct aberrations.

Figure 8:
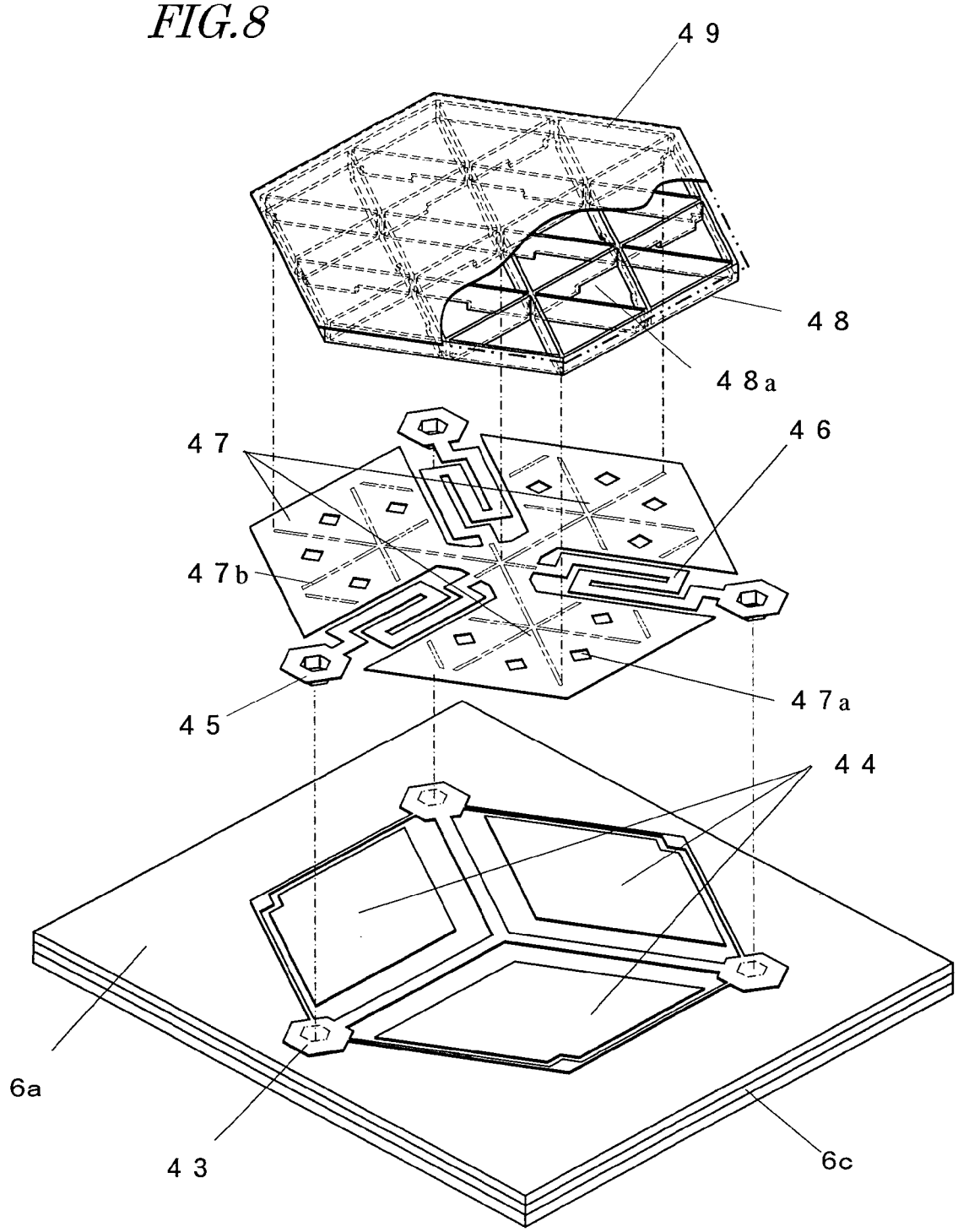
FIG. 8 An exploded perspective view showing a mirror device according to an embodiment of the present invention.

FIG. 8 is an exploded perspective view showing a micromirror 6b, which is a micro-mechanical structure according to the present invention. In FIG. 8, a part of the mirror is cut away to reveal an underlying rib structure. The micromirror 6b is an electrostatic driving-type actuator. The micromirror 6b includes: the base 6a; a movable electrode 47 having a light reflecting surface 49 provided thereon, the movable electrode 47 being capable of displacement relative to the base 6a; elastic supporting members 46 for supporting the movable electrode 47; and stationary electrodes 44 formed on the base 6a so as to oppose the movable electrode 47. As will be later described in detail, the movable electrode 47 and the stationary electrodes 44 double as a mirror driving section for displacing the light reflecting surface 49 and as a detection section for detecting a physical condition(s) to which the micromirror 6b is subjected.

The base 6a is obtained by covering with an insulating layer the uppermost layer of a CMOS circuit 6c which is formed on a silicon substrate, and planarizing it. On the insulating layer, a ground electrode 43 and three stationary electrodes 44 are formed. For the ground electrode 43 and the stationary electrodes 44, an electrically conductive material is used which permits low-temperature film formation at 450° C. or below, such as aluminum (Al) alloy or polysilicon germanium (Poly-SiGe). Each of the three stationary electrodes 44 is connected to the CMOS circuit through a via (not shown) which is formed on the insulating layer on the surface of the base 6a. The CMOS circuit 6c is capable of applying an independent driving voltage to each stationary electrode 44 within the range of 0 to 5 V. The driving voltage may be set to multiple values of 10 bits, for example.

Support posts 45 are formed on the ground electrode 43. The elastic supporting members 46 and the movable electrode 47 are formed on the same plane so as to have a predetermined gap with respect to the stationary electrodes 44. The three elastic supporting members 46 are disposed so as extend toward the central portion from the support posts 45 in three places. In regions between the elastic supporting members 46, the movable electrode 47 is formed so as to extend out from the central portion at which the three elastic supporting members 46 intersect.

On the movable electrode 47, vertical ribs 48 are formed, upon which the mirror face (light reflecting surface) 49 is further formed.

Chain double-dashed lines indicate vertical rib connecting portions 47b, at which the end faces of the vertical ribs 48 are connected to the movable electrode 47. The vertical ribs 48 are connected over substantially the entire movable electrode 47. Recesses 48a are formed in regions corresponding to the elastic supporting members 46, thus forming gaps corresponding to the level difference.

With this structure, the movable electrode 47, the vertical ribs 48, and the mirror face 49 are integrally supported by the elastic supporting members 46 in a hollow form, and functions as a movable section. The movable section is connected to the ground electrode 43.

When driving voltages are applied to the stationary electrodes 44, the entire movable section is attracted in the direction of the base 6a, due to electrostatic forces acting between the stationary electrodes 44 and the movable electrode 47. Depending on the balance between the driving voltages on the three stationary electrodes 44, the movable section may be translated down, or tilted in multi-axial directions.

When application of driving voltages is stopped, the movable section restores its original position and original posture due to the elastic restoring forces of the elastic supporting members 46.

Figure 9:
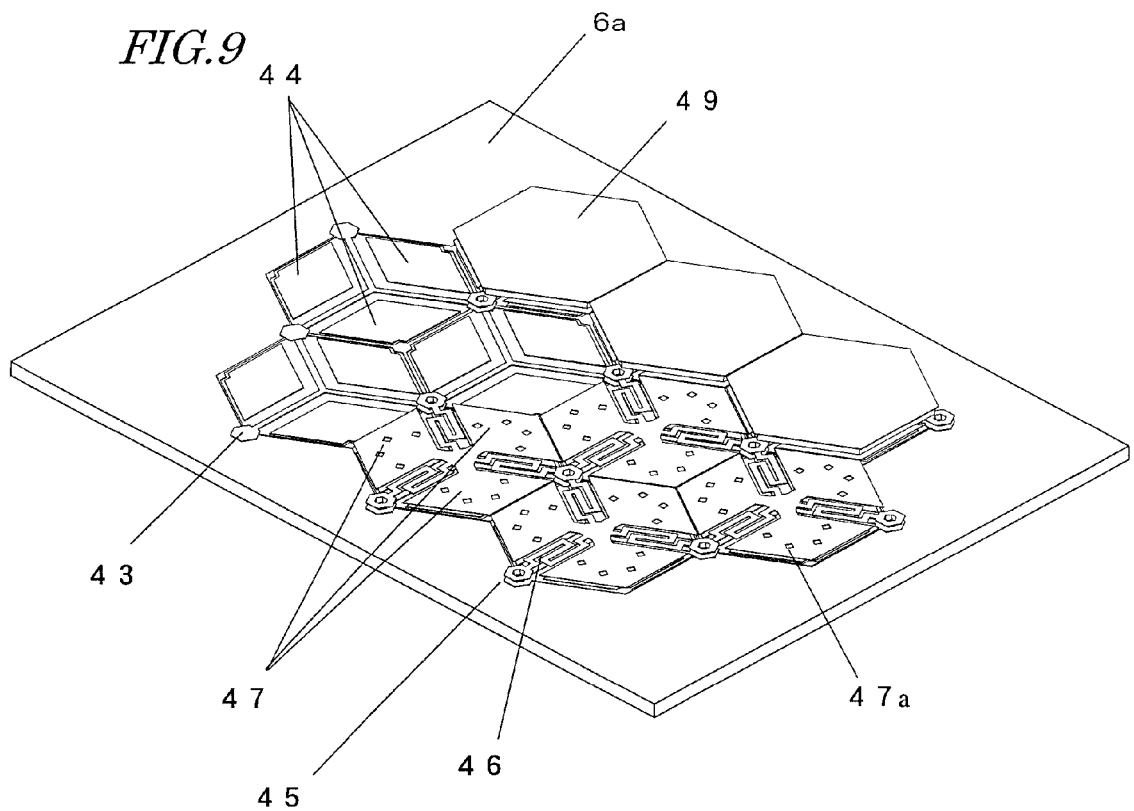
FIG. 9 A perspective view showing a mirror array structure of an aberration correcting device according to an embodiment of the present invention.

FIG. 9 shows a mirror array in which unit cells of the above structure are arrayed in a two-dimensional manner.

In order to reveal the underlying structure, the mirror sections and further the movable electrodes and elastic supporting members are partially omitted from illustration in FIG. 9.

With reference to FIG. 9, the mirror faces 49, which are formed in regular hexagons, are disposed at a constant interval (e.g. 1 μm). Between adjoining cells, the elastic supporting members 46 are formed so as to share support posts 45. The mirror devices share the base 6a.

By controlling translation/tilt of each mirror face 49 in the aforementioned manner with this structure, an arbitrary wavefront can be formed as a whole, whereby the wave aberration of the reflected light can be controlled.

The number of mirror cells is determined based on the necessary wavefront accuracy to be formed by the mirror array. As the number of mirror cells is increased, the accuracy of wavefront approximation will increase, but the amount of control data for the mirrors will become enormous, thus resulting in an increased load on the control circuitry. Moreover, the transfer rate of control data will bottleneck the response speed of the entire mirror array so as to become greatly lowered. Therefore, within a range where the necessary approximation accuracy is obtained, it is preferable to minimize the number of mirrors.

In the present embodiment, the width of each mirror cell is about 100 μm, as derived by dividing a φ2 mm beam diameter by twenty.

Moreover, the necessary amount of displacement of each mirror is determined by adding, to a half wavelength of the laser light wavelength, a displacement which is necessary for obtaining a maximum tilt. The maximum tilt is determined by the amount of aberration to be corrected. Herein, for blue laser light of a wavelength of 405 nm, the maximum amount of displacement is 0.6 μm, as derived from a half wavelength of 203 nm+a tilt of about 400 nm.

Next, a method for detecting a capacitance C of the mirror device will be described. With reference to FIG. 8, assuming that a distance between a stationary electrode 44 and the movable electrode 47 is D; a dielectric constant between the electrodes is $\in$; and the area of the movable electrode 47 is S, then the capacitance C is expressed as $C = \in \cdot S/D$. As the distance D changes, the capacitance C also changes. On a driving signal which is applied to the stationary electrode 44, the CMOS circuit 6c superposes a signal of a high-frequency (a frequency which is high as compared to that of the driving signal). The CMOS circuit 6c is able to detect the capacitance C from the phase and amplitude of an electric current which flows in the movable electrode 47 in accordance with the high-frequency signal which is applied to the stationary electrode 44. Thus, the capacitance C can be detected from changes in the electric current flowing in the movable electrode 47. Moreover, with this detection method, it is possible to detect the capacitance C even while the mirror device is being driven. Note that detection of the capacitance C and detection of the amount of displacement may also be performed by the detection signal conversion section 102.

The optical head device 100 includes a collision prevention mechanism 9 for preventing the objective lens 8 from coming into contact with the optical disk medium 10. Moreover, as an optical element which can alternatively serve the aberration correction function of the aberration correcting device 6, the optical head device 100 includes the beam expander 4 having a driving section. In the case where the beam expander 4 is employed as an optical element which alternatively serves the aberration correction function of the aberration correcting device 6, the aberration correcting device 6 might be replaced by an optical element having a reflection surface. The beam expander 4 includes an optical element mechanism for controlling the position of the beam expander 4, and is driven by the optical element mechanism driving section 112.

The traverse mechanism 13 transports the optical head device 100 along a radial direction of the optical disk medium 10. The loading mechanism 14 and the disk tray 41 transport the optical disk medium 10 to the rotation mechanism 15 for rotating the optical disk medium 10. The cooling fan 17 cools the component elements of the optical information apparatus 101 as well as the electronic substrate on which they are formed.

Hereinafter will be described an operation in the optical information apparatus 101 of performing feedback control by using an amount of displacement obtained from a displacement detection member of the aberration correcting device 6 or using a signal which is obtained by subjecting the amount of displacement to a conversion by the detection signal conversion section 102.

An amount of displacement that is obtained from a displacement detection member of the aberration correcting device 6 is subjected to a conversion by the detection signal conversion section 102 into a signal which is necessary for perform control, and is fed back.

In the optical head device 100, since the laser light source 1 has temperature dependence in its current-optical power characteristics, a temperature signal which is converted from an amount of displacement is fed back to the laser light source driving section 108, and control of the light amount of the laser light source 1 is performed.

A signal from the photodetector 12 and a temperature signal, an acceleration signal, and an angular velocity signal which are converted by the detection signal conversion section 102 are fed back to the objective lens mechanism driving section 104, whereby control of the objective lens mechanism section 7 is performed. The objective lens mechanism section 7 performs focusing and tracking servo for the objective lens 8. This makes it possible to effect a temperature compensation for the actuator sensitivity of the objective lens mechanism section 7 and also to perform control against disturbances.

When an acceleration disturbance that exceeds the servo stiffness of the objective lens mechanism section 7 is detected, an acceleration signal is fed back to the collision prevention mechanism driving section 109, whereby control of the collision prevention mechanism 9 is performed. The collision prevention mechanism 9 comes between the objective lens 8 and the optical disk medium 10 to prevent contact between the two.

The traverse mechanism 13 transports the optical head device 100 along a radial direction of the optical disk medium 10. A temperature signal and an acceleration signal are fed back to the traverse mechanism driving section 107, whereby temperature compensation for a motor of the traverse mechanism 13 and control with respect to acceleration are performed.

The loading mechanism 14 transports the optical disk medium 10 to the rotation mechanism 15. A temperature signal and an acceleration signal are fed back to the loading mechanism driving section 110 for driving the loading mechanism 14, whereby temperature compensation for a motor of the loading mechanism 14 and control with respect to acceleration are performed.

The tilt mechanism 16 causes the rotation mechanism 15 for rotating the optical disk medium 10 or the optical disk medium 10 to be tilted. A temperature signal, an acceleration signal, and an angular acceleration signal are fed back to the optical disk medium rotation mechanism driving section 106 or the optical disk medium tilt mechanism driving section 105, whereby driving of the tilt mechanism 16, temperature compensation for a motor of the rotation mechanism 15, and control with respect to acceleration and angular velocity disturbances are performed.

The cooling fan 17 allows the inside of the optical information apparatus 101 to be cooled. A temperature signal is fed back to the cooling fan driving section 111 for driving the cooling fan 17, whereby control for reducing the fluctuations in characteristics due to a temperature increase is performed.

Moreover, in order to limit the operation of the mechanism system at the time of condensation or prior to condensation, the detection signal conversion section 102 detects a dew point from a temperature signal and a humidity signal, and feeds it back to the driving sections in the mechanism system.

Thus, by using amounts of displacement which are detected by displacement detection members in the aberration correcting device 6, or signals obtained through conversions of the amounts of displacement, it becomes possible to eliminate a number of detectors which would have been individually provided in order only to obtain detection signals which are necessary for feedback control.

Note that the above-described optical information apparatus 101 is exemplary, and the mechanisms for performing feedback are not limited to the above.

Embodiment 2

Next, an operation will be described where the aberration correcting device 6 is driven by time division, so as to alternate between an aberration correction for the converging optical system and a detection of an amount of displacement.

Figure 2:
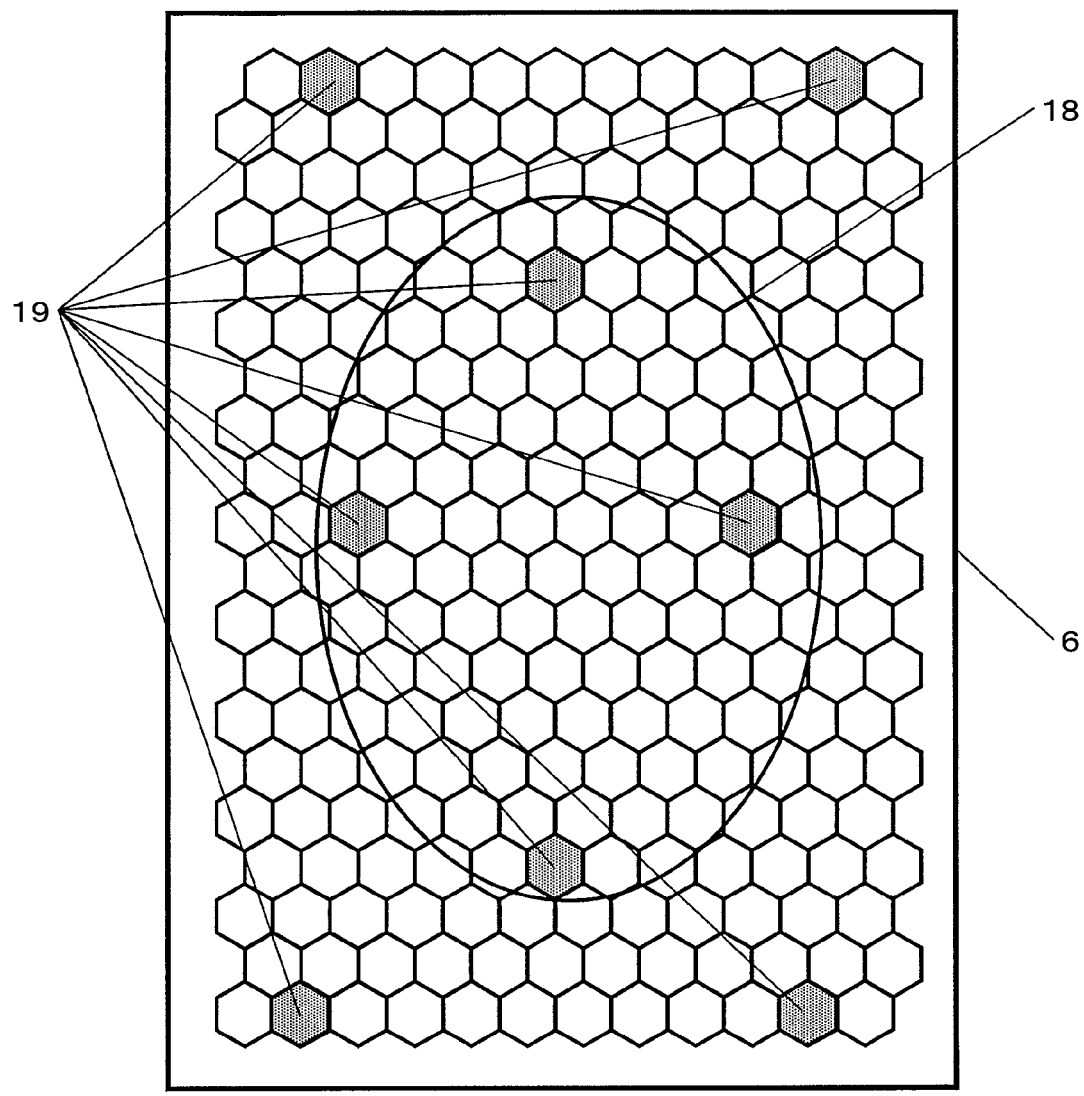
FIG. 2 A diagram illustrating time division driving according to an embodiment of the present invention.

FIG. 2 shows a light beam 18 obliquely striking the surface of displacement detection members 19 in the aberration correcting device 6. The displacement detection members 19 are parts of a micromirror array in which micromirrors 6b for correcting the aberration of the converging optical system are arranged in a two-dimensional manner, and are able to form an arbitrary wavefront. Each displacement detection member 19 is an electrostatic driving-type actuator such that an amount of displacement of the movable section can be obtained from a change in capacitance.

To this micromirror array including the displacement detection members 19, control signals for correcting an aberration of the converging optical system are sent from the wavefront pattern generator 103. As the displacement detection members 19, parts of the micromirror array detect amounts of displacement in capacitance. At a high speed, the CMOS circuit 6c switches between driving of the displacement detection members 19 for correcting the aberration and an operation of detecting amounts of displacement from the displacement detection members 19. Note that, in the case of employing those mirror devices which are in the light-beam irradiated region as the displacement detection members, the detection of amounts of displacement is to be performed within a range where necessary aberration correction is ensured.

This time division driving approach is particularly effective in the case where each entire displacement detection member is irradiated with a light beam.

Moreover, during tracking control, the irradiation position of the light beam 18 will shift, and therefore the mirror devices which are employed as the displacement detection members may be shifted in accordance with the amount of this shift.

Embodiment 3

Next, structures for the displacement detection members in the aberration correcting device 6 for obtaining a temperature signal, a humidity signal, an acceleration signal, an angular velocity signal, and a pressure signal from signals which are obtained through conversion of amounts of displacement obtained from the displacement detection members in the aberration correcting device 6 will be described.

Figure 3A:
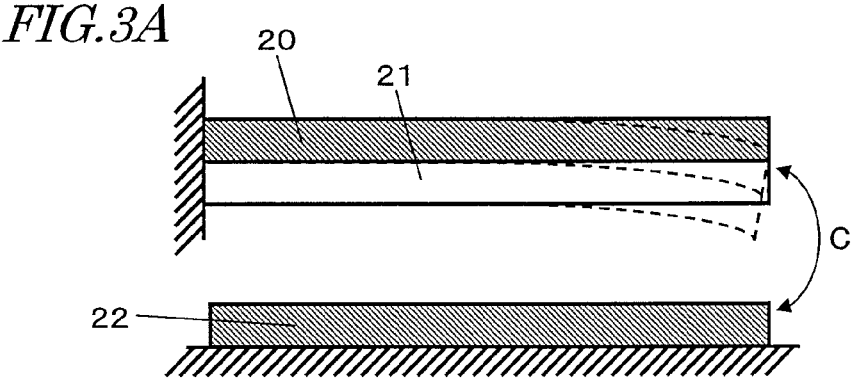
FIG. 3A A diagram showing the structure of a detection section according to an embodiment of the present invention.

FIG. 3A is a side view showing an exemplary displacement detection member structure for obtaining a temperature signal. The displacement detection member has a bimetal cantilever structure in which an aluminum layer 20 and a silicon layer 21 are attached together, the aluminum layer 20 and the silicon layer 21 having mutually different coefficients of expansion. With a gap from the cantilever structure, an aluminum layer 22 is provided. By choosing two materials with considerably different coefficients of expansion, it becomes possible to allow the cantilever structure to have a large warp due to a change in temperature. Because of this warp, the capacitance C occurring between the bimetal cantilever structure and the aluminum layer 22 changes. This capacitance C is detected, and is subjected to conversion for obtaining a temperature signal. For example, the movable electrode 47 (FIG. 8) of at least one mirror device 6b may have the aforementioned bimetal cantilever structure, whereby a displacement detection member for obtaining a temperature signal can be realized.

Figure 3B:
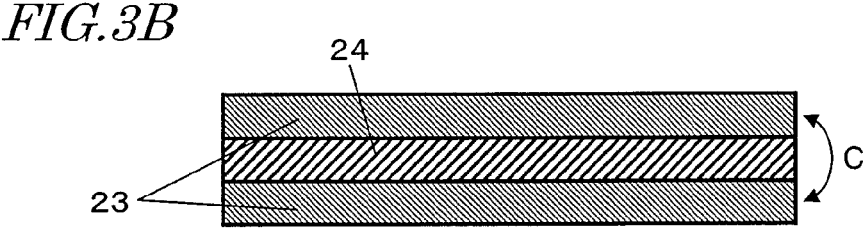
FIG. 3B A diagram showing the structure of a detection section according to an embodiment of the present invention.

FIG. 3B is a side view showing an exemplary displacement detection member structure for obtaining a humidity signal. The displacement detection member has a capacitor structure in which the polymer film 24 is sandwiched between thin metal films of aluminum 23. The capacitance C changes in accordance with the amount of moisture absorbed by the polymer film 24. The capacitance C of this capacitor structure is detected, and subjected to conversion for obtaining a humidity signal. For example, the polymer film 24 may be provided between the movable electrode 47 and the stationary electrodes 44 of at least one mirror device 6b, whereby a displacement detection member for obtaining a humidity signal can be realized.

Figure 3C:
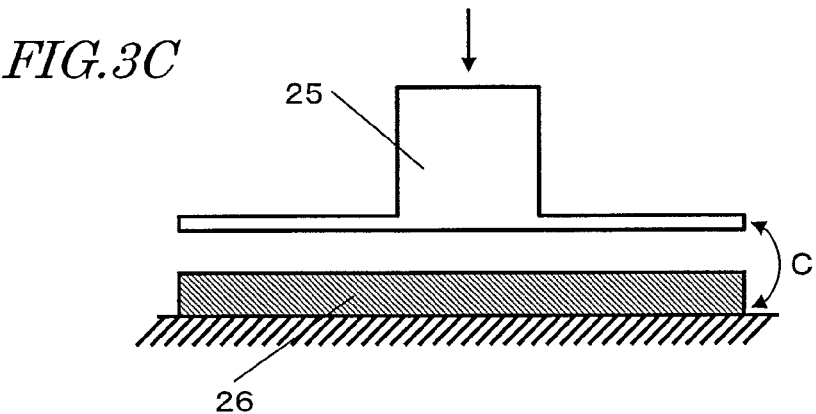
FIG. 3C A diagram showing the structure of a detection section according to an embodiment of the present invention.

FIG. 3C is a side view showing an exemplary displacement detection member structure for obtaining an acceleration signal. The displacement detection member has a structure in which a weight 25 of a movable section that is composed of silicon is hung by a spring, and an aluminum layer 26 is formed with a gap from the weight 25. Due to a displacement of the weight 25 of the movable section, the capacitance C occurring between the weight 25 and the aluminum layer 26 changes. This change in capacitance and time are detected, and subjected to conversion for obtaining an acceleration signal. For example, the weight 25 may be provided for the movable section of at least one mirror device 6b, whereby a displacement detection member for obtaining an acceleration signal can be realized.

Figure 3D:
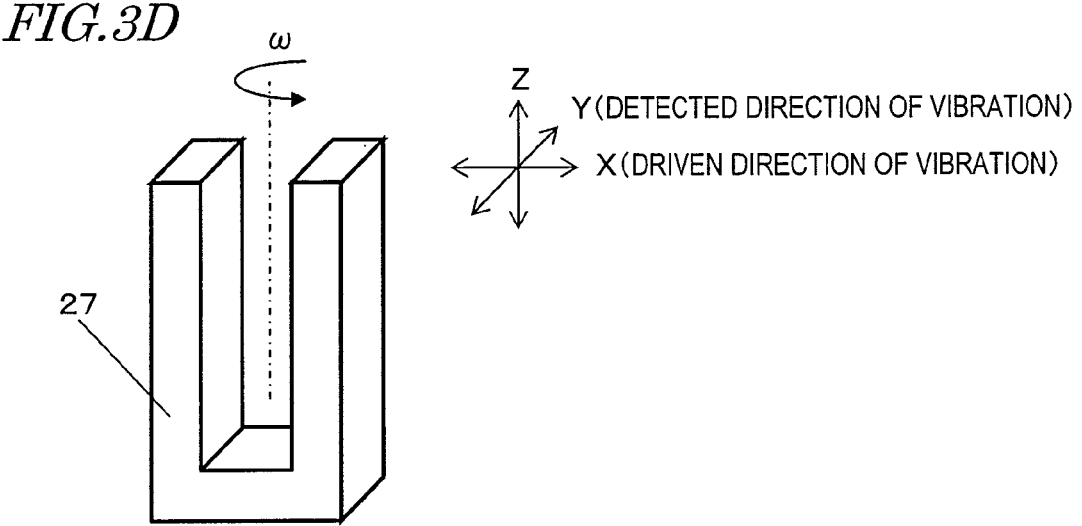
FIG. 3D A diagram showing the structure of a detection section according to an embodiment of the present invention.

FIG. 3D is a perspective view showing a principle of angular velocity detection. When an angular velocity co is applied to a quartz crystal structure 27 of a tuning-fork type which is vibrating at its eigenfrequency, a Coriolis force Y acts perpendicularly to the vibration direction X. This Coriolis force Y is detected, and subjected to conversion for obtaining an angular velocity signal. For example, when an angular velocity is applied to a mirror device 6b whose movable electrode 47 is vibrating up and down relative to the stationary electrodes 44 at its eigenfrequency, a Coriolis force Y acts on the movable electrode 47, whereby a vibration occurs so as to tilt the movable electrode 47 with respect to the stationary electrodes 44. The capacitance C changes due to this tilt. The change in capacitance due to this tilt is detected, and subjected to conversion for obtaining an angular velocity signal. Moreover, changes in the period of the vibration causing a tilt may be detected and subjected to conversion, whereby an angular acceleration signal can be obtained.

Figure 3E:
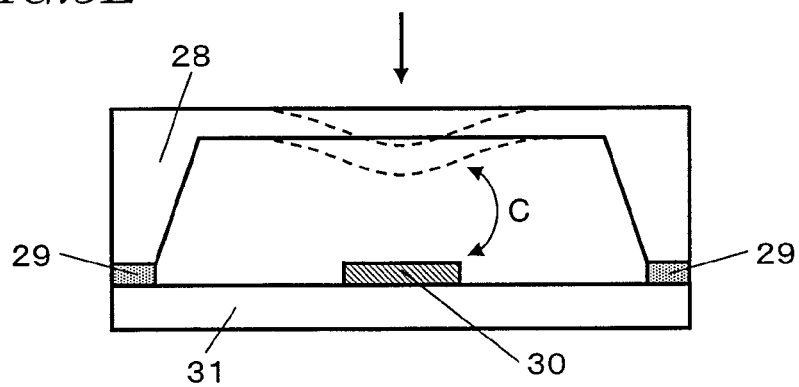
FIG. 3E A diagram showing the structure of a detection section according to an embodiment of the present invention.

FIG. 3E is a side view showing an exemplary displacement detection member structure for obtaining a pressure signal. The displacement detection member has a structure in which an upper silicon layer 28 and a lower silicon layer 31 are bonded together via an oxide film 29 which is an insulating layer, such that the upper silicon layer 28 is strained upon receiving a pressure. A change in the capacitance C occurring between an aluminum layer 30 which is provided between the lower silicon 31 and the upper silicon layer 28, when strained, is detected, and subjected to conversion for obtaining a pressure signal. For example, by detecting a change in the capacitance between the movable electrode 47 and a stationary electrode 44 occurring due to the straining of the movable electrode 47 under pressure, a pressure signal can be obtained.

Note that the above-described displacement detection member structures and methods of detecting amounts of displacement are exemplary, and the present invention is not limited to such structures and detection methods.

Embodiment 4

Figure 4:
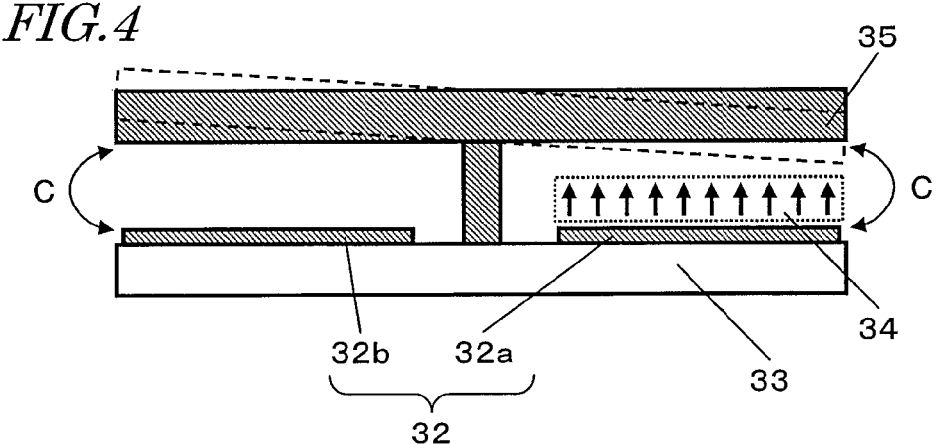
FIG. 4 A diagram showing an electrostatic driving-type actuator according to an embodiment of the present invention.

FIG. 4 is a side view showing a mirror device in the aberration correcting device 6. Aluminum layers 32a and 32b are formed as stationary electrode portions 32 on silicon 33. With a gap from the stationary electrode portions 32, an aluminum movable electrode 35 is provided. An upper face of the movable electrode 35 is a reflection surface which reflects light. When a voltage is applied to the aluminum layer 32a, which is a stationary electrode, a potential difference occurs between the aluminum layer 32a and the movable electrode 31. From this potential difference, an electrostatic attraction 34 is generated, thus causing an operation of tilting the movable electrode 31. In the case where this mirror device is used as a detector, the distance between the movable electrode 35 and the stationary electrodes 32 changes in accordance with the physical conditions, so that the capacitance C occurring between the electrodes changes, and the amount of change in this capacitance C is detected.

Embodiment 5

Figure 5:
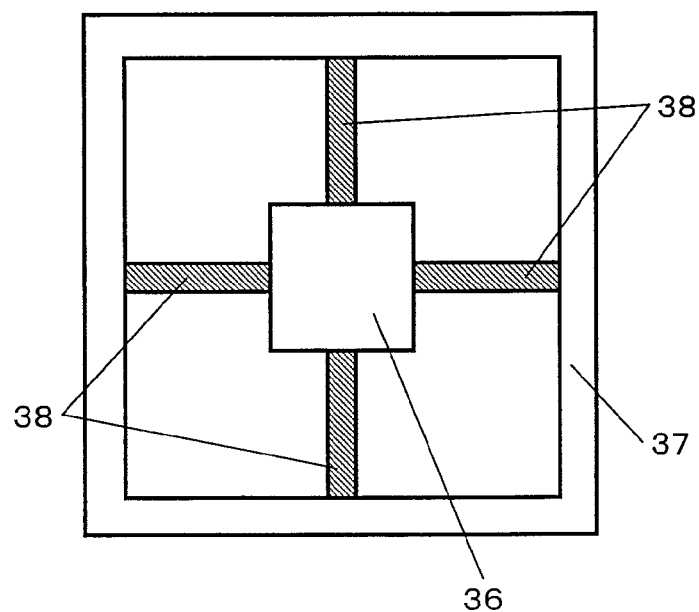
FIG. 5 A diagram showing a piezoelectric element-type actuator according to an embodiment of the present invention.

FIG. 5 is an upper plan view showing an actuator structure of a piezoelectric element-type. By applying a voltage to piezoelectric elements 38, a silicon movable section 36 can be displaced. An upper face of the silicon movable section 36 is a reflection surface which reflects light, and the actuator functions as a mirror device. When the silicon movable section 36 is displaced in accordance with the physical conditions, a voltage occurs in a piezoelectric element(s) 38; therefore, this generated voltage is detected and subjected to conversion, whereby a feedback signal is obtained. From these two characteristics, it is possible to use the actuator of a piezoelectric element-type as a mirror device or as a detector.

Embodiment 6

Figure 6:
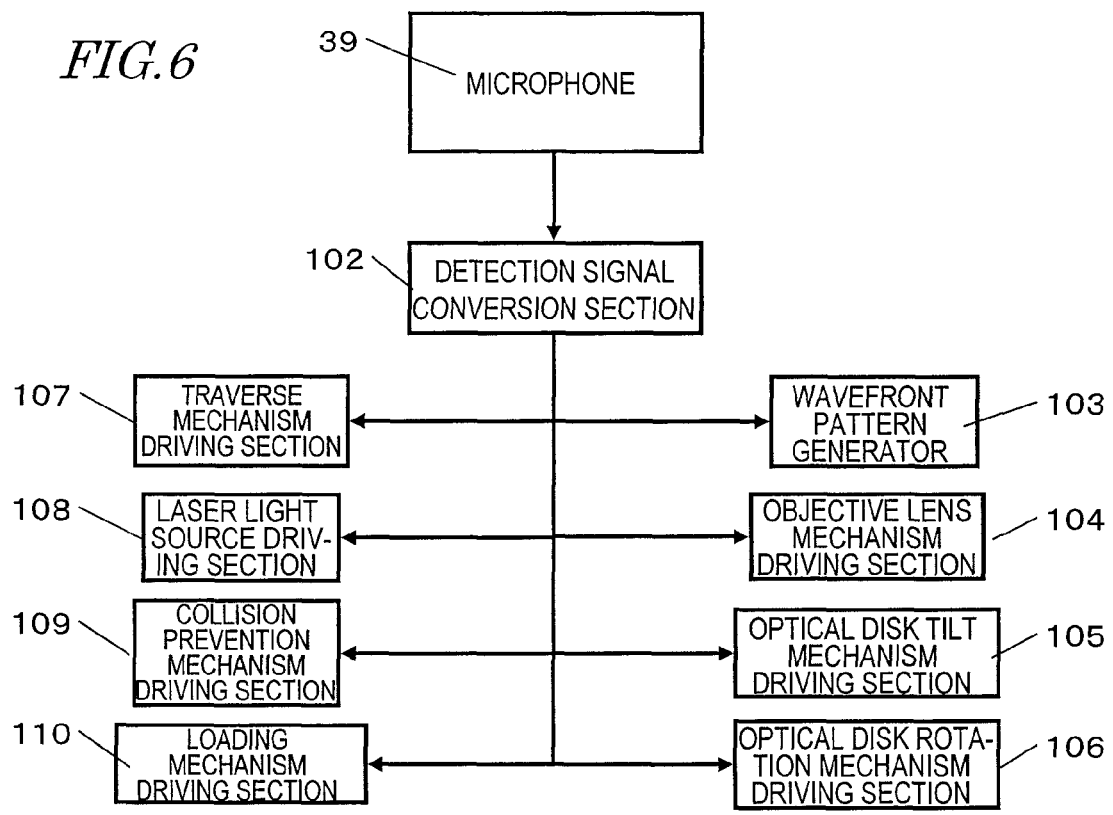
FIG. 6 A diagram illustrating sound pressure detection with a microphone according to an embodiment of the present invention.

FIG. 6 is a diagram showing a microphone 39 included in the aberration correcting device 6. Pressure, which is a physical condition, also encompasses sound pressure. The microphone 39 is provided in the aberration correcting device 6 for detecting sounds around the aberration correcting device 6, such that feedback control is performed for the component elements of the optical information apparatus 101 in accordance with the detected sounds. For example, if any abnormal sound occurs in the loading mechanism 14 that gives a reason to judge that stable control operation would be difficult, the rotation mechanism 15, or the tilt mechanism 16, etc., the detection signal conversion section 102, then a signal for stopping the operation is output to each driving section.

Note that the aforementioned procedure of signal transmission is exemplary, and the detection section in the aberration correcting device 6 that inputs a signal to the detection signal conversion section 102 and the driving sections which are feedback-controlled by the detection signal conversion section 102 are not limited to the above.

Embodiment 7

Figure 7:
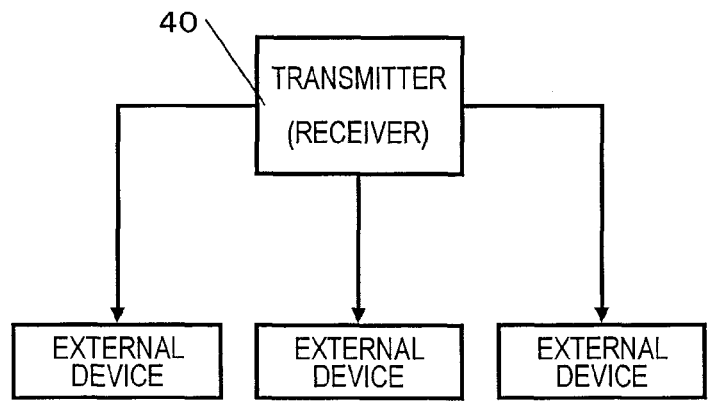
FIG. 7 A diagram showing an aberration correcting device having a transmission/reception function according to an embodiment of the present invention.

FIG. 7 is a diagram showing a transmitter 40 included in the aberration correcting device 6. By providing in the aberration correcting device 6 the transmitter 40 for sending out signals to the exterior, it becomes possible to perform communications with external devices.

If a receiver is provided in the aberration correcting device 6, both-way communications with external devices would become possible.

Embodiment 8

Next, with reference to FIG. 10A to FIG. 10H, production processes for a mirror device included in the aberration correcting device 6 and the structure of an acceleration sensor which is formed by using the production processes will be described. Each of FIG. 10A to FIG. 10H includes a plan view and a cross-sectional view illustrating the respective production step. Note that, for simplicity of description, the cross-sectional views are drawn so as to emphasize the characteristic portions of the structure, without necessarily being faithful cross-sectional views to the actual product.

Figure 10A:
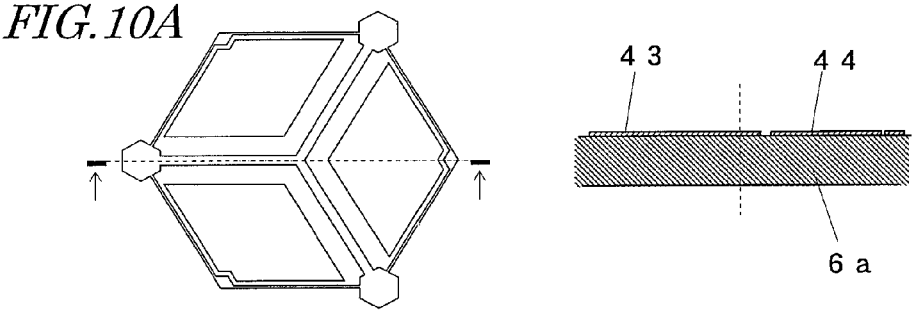
FIG. 10A A diagram showing a production method for an aberration correcting device according to an embodiment of the present invention.

FIG. 10A shows a ground electrode 43 and stationary electrodes 44 having been formed on a base 6a. Typically, an aluminum film having a thickness of 0.5 µm is formed by sputtering technique, and patterned by photolithography technique. As described above, the base 6a is obtained by covering the uppermost layer of a CMOS circuit formed on a silicon substrate with an insulating layer, and planarizing it. Although not shown, each electrode is electrically connected to CMOS circuitry through a contact via which is provided in the insulating layer.

Figure 10B:
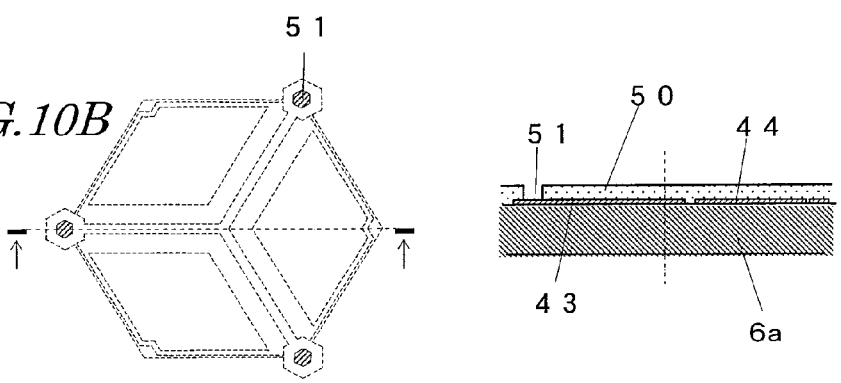
FIG. 10B A diagram showing a production method for an aberration correcting device according to an embodiment of the present invention.

Referring to FIG. 10B, a sacrificial layer 50 covering the ground electrode 43 and the stationary electrodes 44 is formed. The sacrificial layer 50 is formed of a photoresist (e.g. AZP4000 series manufactured by 2008 AZ Electronic Materials) or photosensitive polyimide (e.g. PI2727 manufactured by HD MicroSystems). After the photoresist or photosensitive polyimide has been applied by spin coating technique, exposure and development is performed through a photolithography process to form vias 51, and UV-curing is performed to effect curing.

The vias 51 serve as holes in which to form support posts 45. The film thickness of the sacrificial layer 50 defines an inter-electrode gap. When a displacement occurs over ⅓ or more of the inter-electrode gap, an electrostatic actuator will experience a pull-in and thus become uncontrollable. Therefore, in order to permit stable control, the inter-electrode gap (i.e., the film thickness of the sacrificial layer 50) is set to 3 µm, which is five times as large as the maximum amount of displacement (0.6 µm).

Referring to FIG. 10C, a metal layer composing the elastic supporting members 46 and the movable electrode 47 is deposited on the sacrificial layer 50, and is patterned. An aluminum alloy is used for the metal layer. Etching holes 47a are also patterned at the same time.

The thickness of the metal layer is determined through designing of the spring modulus of the elastic supporting members 46. Herein, the spring modulus is determined so that a maximum displacement is obtained at a driving voltage of 5 V, the film thickness being 0.3 µm.

The movable electrode 47 has the same film thickness, and has a similar flexural rigidity to that of the elastic supporting members 46. Therefore, if it were subjected to electrostatic driving as it is, the movable electrode 47 would deform toward the stationary electrodes 44 together with the deformation of the elastic supporting members 46. However, vertical ribs to be formed in a subsequent step will be connected to substantially the entire area of the movable electrode 47, whereby reinforcement is realized by the high rigidity of the vertical ribs, thus preventing the aforementioned deformation.

Thus, it is unnecessary to prescribe different thicknesses for the elastic supporting members 46 and the movable electrode 47, and a one-time film formation will suffice, whereby the process will be simplified.

Referring to FIG. 10D, a sacrificial layer 52 is applied onto the metal layer by spin coating technique, and a via 53 is formed in the region of the movable electrode 47. A similar material to that of the sacrificial layer 50 is used for the sacrificial layer 52.

In the regions of the via 53, the vertical ribs (described later) are connected to the movable electrode 47. In the other regions, i.e., regions of the elastic supporting members 46, the vertical ribs are formed so as to leave a gap corresponding to the film thickness of the sacrificial layer 52. This film thickness must be equal to or greater than the maximum displacement stroke of the movable section, while taking fluctuations into consideration, and yet thinner than the sacrificial layer 50, and is herein 1.5 µm. The sacrificial layer 52 is also cured by UV-curing.

Referring to FIG. 10E, a sacrificial layer 54 is further applied by spin coating technique, and patterned through a photolithography process to form trenches 55. A thick-coating resist (e.g., TSMR-iN1000PM manufactured by TOKYO OHKA KOGYO CO., LTD.) having a high aspect ratio is used for the sacrificial layer 54. The thickness of the sacrificial layer 54 defines the height of the vertical ribs 48 (described later), and is determined while taking into consideration the rigidity of a movable section which combines the movable electrode 47, the vertical ribs 48, and the mirror face 49 together. Herein, the sacrificial layer 54 has a film thickness of 10 µm, and the trench width is 1 µm.

Referring to FIG. 10F, the vertical ribs 48 and the mirror face 49 are formed by embedding a metal in the trenches 55. As the metal embedding method, a formation technique which realizes good film formation in deep grooves, such as a method of sputtering an aluminum alloy by collimating sputtering or long throw sputtering, or a method of embedding copper or nickel by plating, is selected. Within each trench, a film grows toward the center equally from both side walls of the trench, and after merging at the trench center, further continues upward film growth to form the mirror face 49. At this time, dents 58 corresponding to the vertical ribs 48 are left in the mirror face 49. This step of embedding metal will be described in detail later.

Referring to FIG. 10G, the surface of the mirror face 49 is polished by CMP (Chemical Mechanical Polishing) to form a mirror surface. A mirror outer shape is patterned out by wet etching, thereby forming gaps with adjoining mirrors. In the case where an aluminum alloy is used as the embedded metal, the aluminum alloy in itself can be utilized as a mirror face. In the case where any other metal such as copper is used, a thin reflective layer of aluminum or silver is further deposited on the surface to form a mirror face.

Referring to FIG. 10H, the sacrificial layers are removed by oxygen plasma etching, whereby the movable section is released. The sacrificial layer 50 portion becomes a gap 56, and the sacrificial layer 52 portion becomes a gap 57. As a result, the movable section which is composed of the elastic supporting members 46, the movable electrode 47, and the mirror face 49 becomes capable of displacement, whereby the mirror device is completed.

As shown in FIG. 10H, the ground electrode 43 is grounded, and a driving voltage +Vd is applied to the stationary electrodes 44, whereby an electrostatic attraction occurs between the stationary electrodes 44 and the movable electrode 47, thus pivoting the mirror clockwise. When the same voltage is applied to all of the stationary electrodes 44, the mirror will translate toward the base 6a.

Next, with reference to FIG. 11(a) and FIG. 11(b), a step of embedding a metal layer 58 into the trenches 55 formed in the sacrificial layer 54 will be described.

When the metal material of the metal layer 58 is deposited by a method such as collimating sputtering, residual stresses are generated in the crystal growth directions indicated by arrows, such that a stress gradient exists along the film thickness direction. These stresses will change in various manners depending on the film forming conditions, such as the deposition rate or temperature. Assuming that a stress gradient occurs such that an increasing compressive stress exists in a crystal growth direction, a stress gradient in the +Z direction will exist at the mirror face 49 portion, and a bending moment which tends to cause an upward warp is at work. On the other hand, inside the trench 55, growth occurs from both side faces toward the center of the trench width. As a result, stress gradients which are symmetric in the ±X direction will exist, and the stress gradients will be canceled when finally merging at the trench central portion as shown in FIG. 11(b). In other words, in the vertical rib 48 portion that is formed inside the trench 55, no Z direction stress gradient exists. Therefore, the vertical ribs 48 do not have any stress gradient along the Z direction, and they themselves do not generate any bending moment for causing a warp. Accordingly, by setting a width and a height for conferring a rigidity which is sufficient for correcting a warp of the mirror face 49 portion, it becomes possible to suppress a warp associated with the stress gradient in the mirror face 49. Furthermore, the movable electrode 47 is connected also to the lower ends of the vertical ribs 48. As a result, even if the movable electrode 47 and the mirror face 49 are thin, the rigidity of the vertical ribs 48 permits the movable section to be a very highly rigid structure.

Through such production processes, a very light-weight and high-rigidity movable section is formed.

Embodiment 9

A patterning for forming a structure to serve as a weight of an acceleration sensor, at the time of forming trenches 55 through the production processes for a mirror device shown in FIG. 10E to FIG. 10H, will be described with reference to FIG. 12A to FIG. 12D.

Referring to FIG. 12A, in the production process shown in FIG. 10E, the patterning for forming trenches 55 is performed in such a manner that a part of the triangle shapes of a sacrificial layer 54 is not left. In other words, the width of a portion of the trenches is made broader than in the other portions.

Referring to FIG. 12B, in the production process shown in FIG. 10F, a metal is embedded to form vertical ribs 48 and a mirror face 49. At this time, a weight 59 is also formed in the aforementioned portion having a broad width.

Referring to FIG. 12C, as in the production process shown in FIG. 10G, the surface of the mirror face 49 is polished by CMP to form a mirror surface, and a mirror outer shape is patterned out by wet etching, thereby forming gaps with adjoining mirrors.

Referring to FIG. 12D, as in the production process shown in FIG. 10H, the sacrificial layers are removed by oxygen plasma etching, thus releasing the movable section. The sacrificial layer 50 portion becomes a gap 56, and the sacrificial layer 52 portion becomes a gap 57. As a result, a movable section having the elastic supporting members 46, the movable electrode 47, the mirror face 49, and the weight 59 becomes capable of displacement.

Through such production processes, at the same time of forming a very light-weight and high-rigidity mirror face, there is also formed a structure to serve as a weight of an acceleration sensor. By monitoring the capacitance occurring between the movable electrode and a stationary electrode, a displacement of the weight 59 in response to an occurrence of acceleration is detected as a change in capacitance.

An acceleration signal thus detected can be used for the feedback control of at least one of the component elements of the optical information apparatus 101 described above.

Note that the component element(s) to be subjected to feedback control with the acceleration signal is not limited to the movable mechanism section.

Moreover, when the weight 59 is displaced in response to an occurrence of angular velocity, a displacement takes place between the movable electrode 47 and the stationary electrodes 44. By sequentially applying a high-frequency signal to the three stationary electrodes 44 to detect a change in capacitance with respect to each of the three stationary electrodes 44, such a displacement between the movable electrode 47 and the stationary electrodes 44 can be detected, and an angular velocity signal can be obtained.

Embodiment 10

With reference to FIGS. 13(a) to 13(h), specific positioning of the weight 59 in an acceleration sensor will be described.

FIG. 13(a) shows the structure of a micromirror 6b in the aberration correcting device 6.

FIG. 13(b) shows a structure in which a weight 59 of an acceleration sensor is formed over the entire region of vertical ribs 48 of the micromirror 6b.

FIG. 13(c) shows a structure in which weights 59 of an acceleration sensor are disposed, in the region of the vertical ribs 48 of the micromirror 6b, so as to be balanced out near the support posts 45 (accounting for a surface area of about 25% with respect to the entire region).

FIG. 13(d) shows a structure in which a weight 59 of an acceleration sensor is disposed, in the region of the vertical ribs 48 of the micromirror 6b, in an unbalanced manner near a support post 45 (accounting for a surface area of about 8% with respect to the entire region).

FIG. 13(e) shows a structure in which weights 59 of an acceleration sensor are disposed, in the region of the vertical ribs 48 of the micromirror 6b, so as to be balanced out near the support posts 45 (accounting for a surface area of about 50% with respect to the entire region).

FIG. 13(f) shows a structure in which a weight 59 of an acceleration sensor is disposed, in the region of the vertical ribs 48 of the micromirror 6b, in an unbalanced manner near a support post 45 (accounting for a surface area of about 17% with respect to the entire region).

FIG. 13(g) shows a structure in which a weight 59 of an acceleration sensor is disposed so as to be balanced out at the outer peripheral side of the region of the vertical ribs 48 of the micromirror 6b (accounting for a surface area of about 75% with respect to the entire region).

FIG. 13(h) shows a structure in which, a weight 59 of an acceleration sensor is disposed, in the region of the vertical ribs 48 of the micromirror 6b, in an unbalanced manner near a support post 45 (accounting for a surface area of about 25% with respect to the entire region).

In addition, the stationary electrodes 44 are formed in shapes opposing such weights 59.

The shapes, regions to be formed, and surface area ratios of these weights 59 are exemplary, and they are not meant as limitations.

Embodiment 11

With reference to FIGS. 14A to 14F, production processes for a temperature sensor will be described in which a bimetal structure is produced by only adding one process to the production processes which have been described with reference to FIG. 10A to FIG. 10H.

Referring to FIG. 14A, in the patterning for forming the trenches 55 shown in FIG. 10E, a partial region of the sacrificial layer 54 is completely patterned away. This region in which the sacrificial layer 54 is completely removed is a region opposing a stationary electrode, and a bimetal structure is to be formed in this region.

Referring to FIG. 14B, as in the production process shown in FIG. 10F, a metal is embedded in the trenches to form vertical ribs 48 and a mirror face 49. At this time, a similar structure to the weight 59 of an acceleration sensor is formed. Similarly to the neighborhood of the elastic supporting members 46, the elastic supporting members 46 and the weight 59 (vertical ribs 48) are not bonded to each other.

Referring to FIG. 14C, as in the production process shown in FIG. 10G, the surface of the mirror face 49 is polished by CMP to form a mirror surface, and a mirror outer shape is patterned out by wet etching. At this time, the weight 59 is removed by etching.

Referring to FIG. 14D, only the sacrificial layer 52 is completely removed by oxygen plasma etching. At this time, the sacrificial layer 54 is removed to the same extent as the sacrificial layer 52, but the sacrificial layer 54 is not completely removed because it has a thickness which is equal to or greater than twice that of the sacrificial layer 52, and, what is more, there is also the sacrificial layer 50. Therefore, structurally there is no problem.

Referring to FIG. 14E, on the metal layer which has been exposed by removal of the sacrificial layer 52 (the elastic supporting members 46 or the movable electrode 47), a metal layer different from that metal material is deposited, and a photoresist is applied by spin coating technique and patterned through a photolithography process, thereby forming a cantilever 61.

Referring to FIG. 14F, the sacrificial layers are removed by oxygen plasma etching, thus releasing the cantilever 61. The sacrificial layer 50 portion becomes a gap 56.

Thus, a temperature sensor having the cantilever 61 as a bimetal structure is completed. By monitoring the capacitance occurring between the movable electrode 47 and a detection electrode 60 of the bimetal structure, a change in capacitance that changes due to a change in temperature can be detected.

Note that the cantilever 61 may have a shape as shown in FIG. 14F, or a shape as shown in FIG. 3A. When seen from above its upper face, the cantilever 61 has a structure with a sufficient width and length relative to its thickness.

A temperature signal which is generated from a detection of deformation of the cantilever 61 can be used for the feedback control of at least one of the component elements of the optical information apparatus 101 described above.

Note that the component elements to be subjected to feedback control with the temperature signal are not limited to the aforementioned component elements.

Embodiment 12

Figure 15:
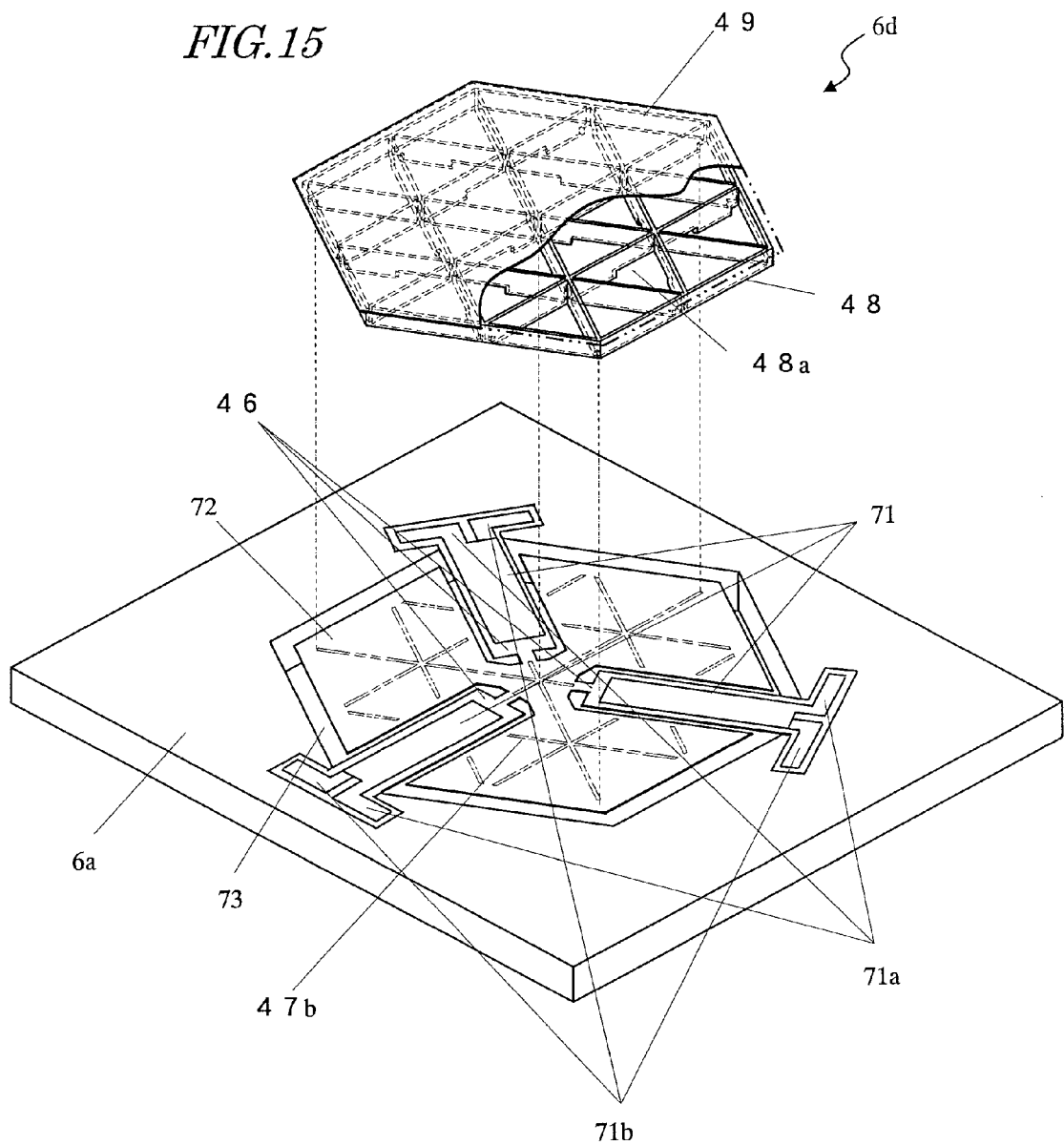
FIG. 15 An exploded perspective view showing a mirror device according to an embodiment of the present invention.

FIG. 15 is an exploded perspective view showing a micromirror 6d, which is a piezoelectric element-type actuator. The micromirror 6d functions as an optical modulation section for modulating light. In FIG. 15, a part of the mirror is cut away to reveal an underlying rib structure.

Figure 13:
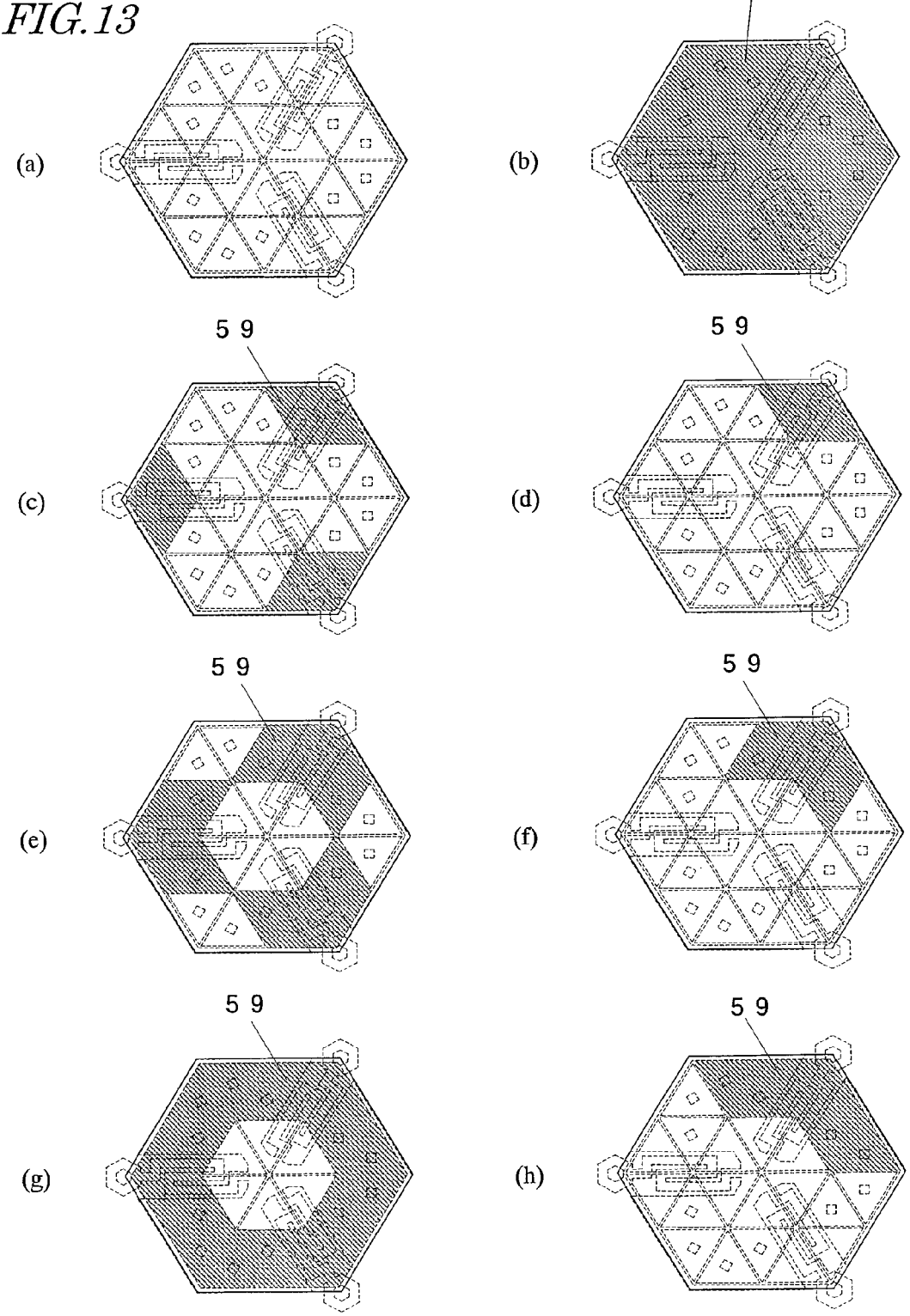
FIG. 13 A diagram showing weight positioning for an acceleration sensor according to an embodiment of the present invention.

The micromirror 6d has a base 6a and a light reflecting surface 49, and includes a movable section 72 which is capable of displacement relative to the base 6a, elastic supporting members 46 for supporting the movable section 72, and piezoelectric members 71 for displacing the movable section 72. The piezoelectric members 71 double as detection sections for detecting physical conditions which are subjected to the micromirror 6d, and detect physical conditions from strain of the piezoelectric members 71. The physical conditions to be detected are similar to those for an electrostatic driving-type micromirror 6b. Moreover, as in the above production processes for the micromirror 6b which have been described with reference to FIG. 10A to FIG. 14F, through the same processes as the production processes for the micromirror 6d, a weight(s) or a bimetal structure(s) is formed in the micromirror 6b. Exemplary positionings of weights are as shown in FIG. 13.

The elastic supporting members 46 are formed on the base 6b, such that the elastic supporting members 46 support the movable section 72. The movable section 72 has vertical ribs 48 and a mirror face 49. A gap 73 is formed between the movable section 72 and the base 6b. The piezoelectric members 71 are formed on the elastic supporting members 46. Each piezoelectric member 71 includes an upper electrode 71a and a lower electrode 71b, such that the piezoelectric member 71 undergoes a displacement when a voltage is applied to the upper electrode 71a and the lower electrode 71b. As the piezoelectric members 71 are displaced, the movable section 72 can be displaced.

Figure 16:
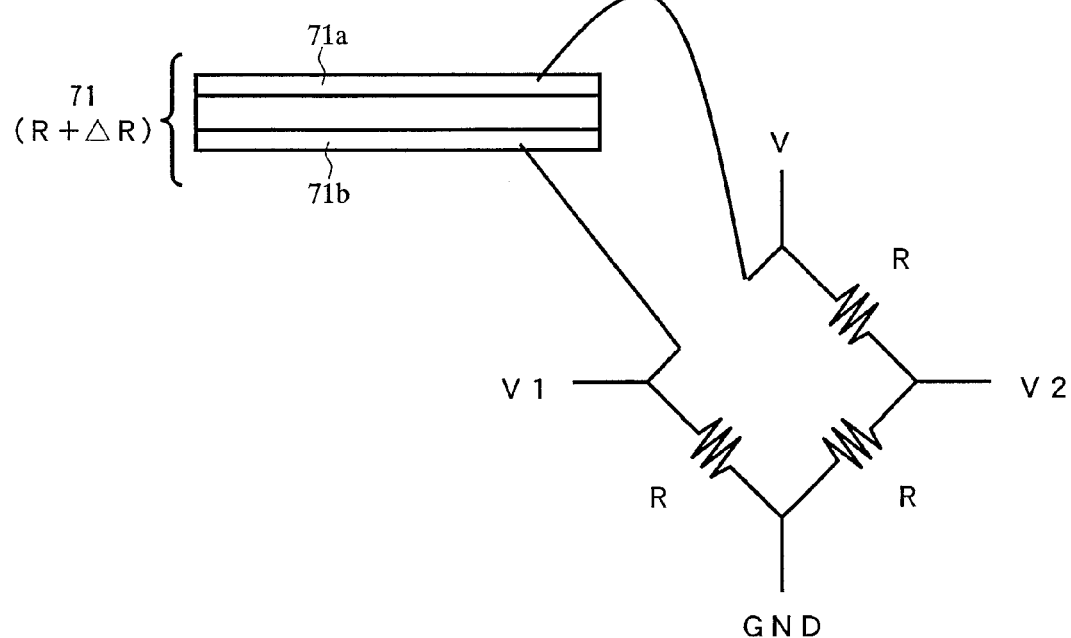
FIG. 16 A diagram showing a detection method for an amount of displacement of a piezoelectric element-type mirror device according to an embodiment of the present invention.

Next, a detection method for an amount of displacement of the piezoelectric element-type micromirror 6d will be described. A CMOS circuit 6c includes a bridge circuit as shown in FIG. 16. Assume a resistance R of a piezoelectric member in the absence of strain, and a change amount in resistance $\Delta R$ of the piezoelectric member when experiencing a strain. The relationship between an applied voltage V, detected voltages V1 and V2, the resistance R, and the change amount in resistance $\Delta R$ is expressed as $V1-V2=-V\times\Delta R/4R$. Thus, $\Delta R$ is calculated by detecting the output voltages V1 and V2. The amount of displacement of the piezoelectric member can be calculated from the change amount in resistance $\Delta R$.

Also, as in the detection method of capacitance C between the stationary electrodes 44 and the movable electrode 47 having been described with reference to FIG. 8, a high-frequency voltage may be applied to one of the upper electrode and the lower electrode, and an amount of displacement of the piezoelectric element may be calculated from the phase and amplitude of an electric current flowing through the other electrode. With this detection method, an amount of displacement can be detected even while the mirror device is being driven.

Embodiment 13

Figure 17:
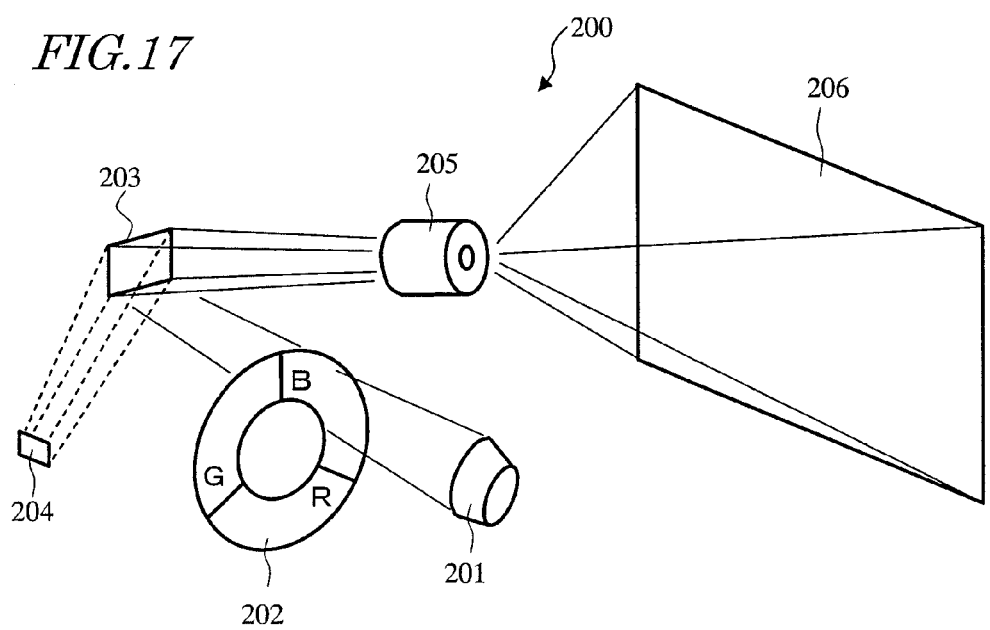
FIG. 17 A diagram showing an image projection apparatus according to an embodiment of the present invention.

FIG. 17 is a diagram showing an image projection apparatus 200 according to the present embodiment. The image projection apparatus 200 includes a spatial light modulation device 203. The spatial light modulation device 203 has a similar construction to that of the aberration correcting device 6 described above, and includes a mirror device and a detector(s) for detecting a physical condition(s). As a result, the image projection apparatus 200 can provide similar effects to those of the optical information apparatus 101.

Light which is radiated from a light source 201 is transmitted through a rotating color filter 202 so as to be converted into red light, green light, and blue light (hereinafter referred to as RGB light). The RGB light enters the spatial light modulation device 203. In accordance with an image frame, the spatial light modulation device 203 reflects the RGB light in the direction of a projection lens 205, and reflects in the direction of a light absorbing plate 204 any light that is unnecessary for image formation. The projection lens 205 magnifies the incident RGB light, whereby a projection image 206 is obtained. Since the spatial light modulation device 203 includes a detector(s) for detecting a physical condition(s), it is possible to perform feedback control for the component elements of the image projection apparatus 200 in accordance with changes in the physical conditions within the image projection apparatus 200.

Embodiment 14

Figure 18:
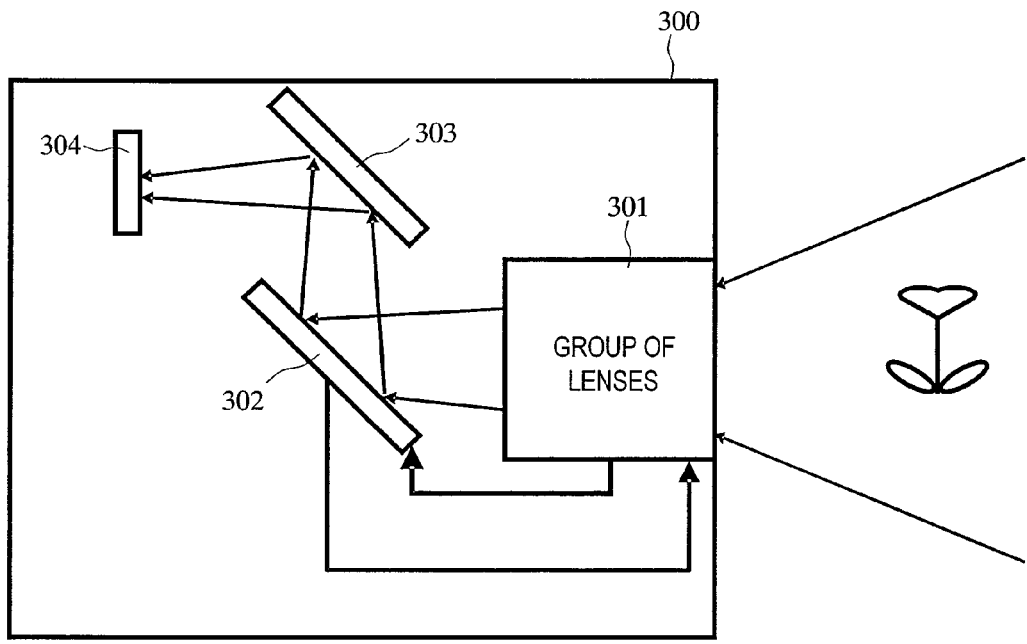
FIG. 18 A diagram showing a camera according to an embodiment of the present invention.

FIG. 18 is a diagram showing a camera 300 according to the present embodiment. The camera 300 includes an aberration correcting device 302. The aberration correcting device 302 has a similar construction to that of the aberration correcting device 6 described above, and includes a mirror device and a detector(s) for detecting a physical condition(s). Thus, the camera 300 can provide similar effects to those of the optical information apparatus 101.

Light reflected from a subject passes through a group of lenses 301 and enters the aberration correcting device 302, where its aberration is corrected. The light whose aberration has been corrected is reflected by a mirror 303, and enters a video recording section 304. The video recording section 304 includes a photosensitive element, and converts the incident light into an image signal and records it. Whereas a usual camera would employ an expensive group of lenses to correct light aberrations, in the camera 300, the aberration correcting device 302 is able to correct aberrations, thus making it unnecessary to use any expensive group of lenses.

Moreover, since the aberration correcting device 302 includes a detector(s) for detecting a physical condition(s), it is possible to perform feedback control for the component elements of the camera 300 in accordance with changes in the physical condition(s) within the camera 300. For example, a feedback signal which is necessary for a handshake correction of the camera can be generated from acceleration, angular velocity, and angular acceleration as detected by the detector(s). Moreover, by monitoring gravitational acceleration, a safety operation can be performed in case of a fall (e.g., returning lenses which are in a zooming state to their original positions).

Embodiment 15

Figure 19:
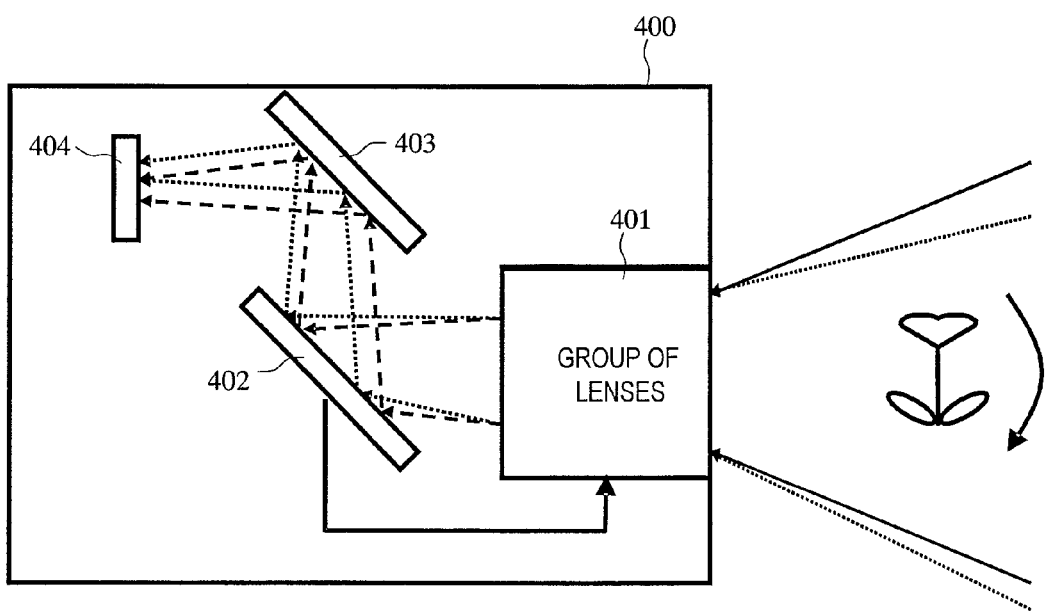
FIG. 19 A diagram showing a camera according to an embodiment of the present invention.
Figure 20:
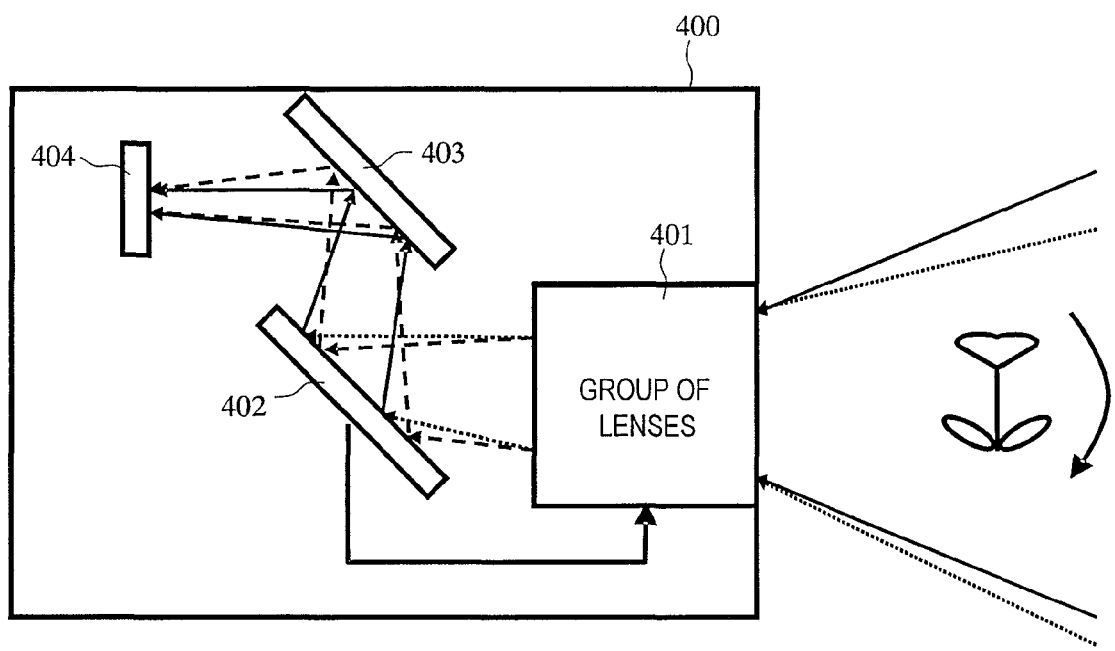
FIG. 20 A diagram showing a camera according to an embodiment of the present invention.

FIG. 19 and FIG. 20 show a camera 400 according to the present embodiment. The camera 400 includes an aberration correcting device 402. The aberration correcting device 402 has a similar construction to that of the aberration correcting device 6 described above, and includes a mirror device and a detector(s) for detecting a physical condition(s). Thus, the camera 400 can provide similar effects to those of the optical information apparatus 101.

Moreover, the aberration correcting device 402 also has a function as a mirror device for handshake correction. FIG. 19 shows an optical path when a handshake correction is not being performed, whereas FIG. 20 shows an optical path when a handshake correction is being performed.

Light from a subject passes through a group of lenses 401 and enters the aberration correcting device 402, where its aberration is corrected. At the same time, the aberration correcting device 402 displaces the mirror device in accordance with an amount of handshake, thus to correct the handshake. The light which has been subjected to aberration correction and handshake correction is reflected by the mirror 403, and enters the video recording section 404. The video recording section 404 includes a photosensitive element, and converts the incident light into an image signal and records it. A feedback signal which is necessary for handshake correction can be generated from acceleration, angular velocity, and angular acceleration as detected by the detector.

Embodiment 16

Figure 21:
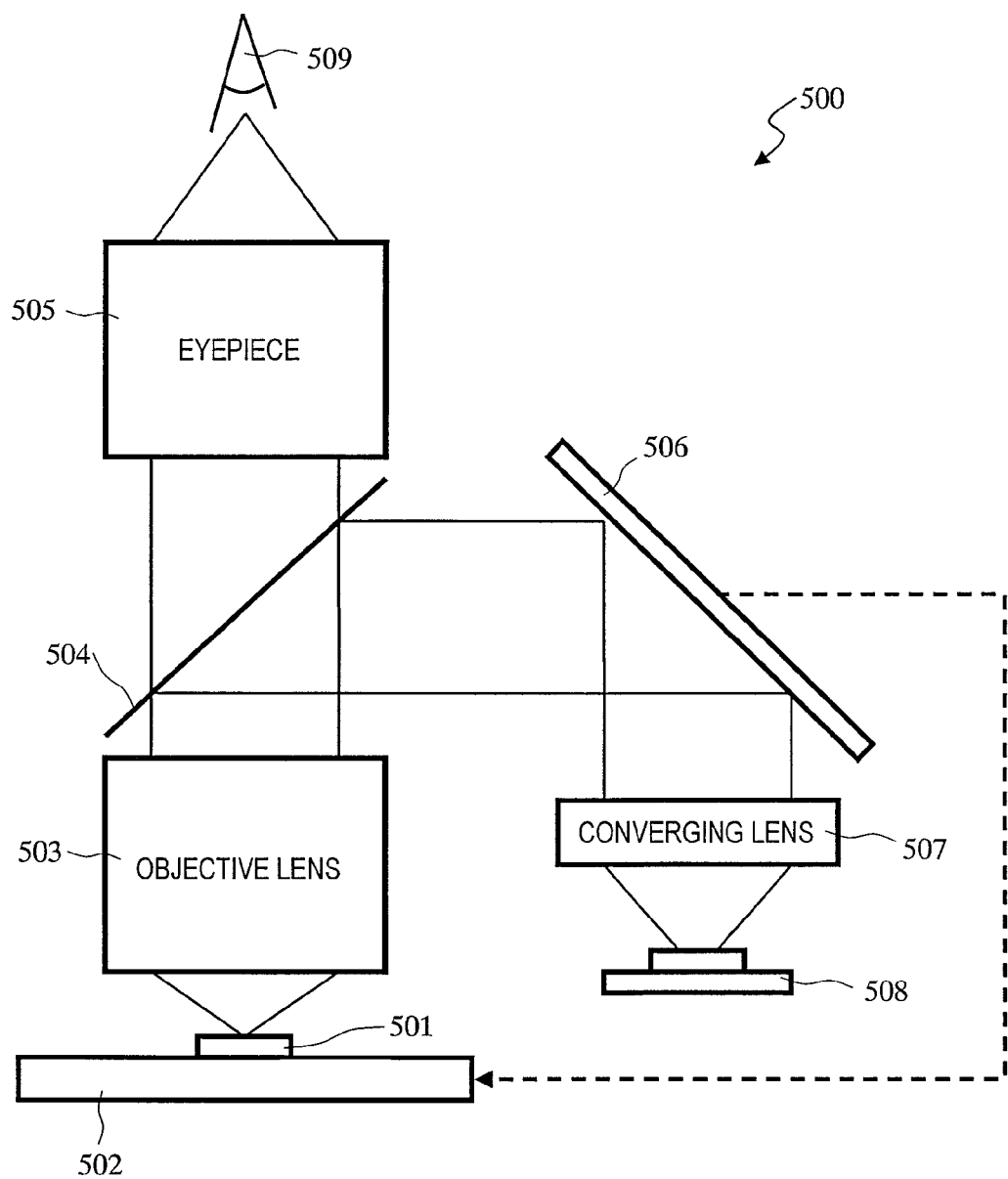
FIG. 21 A diagram showing a microscope according to an embodiment of the present invention.

FIG. 21 is a diagram showing a microscope 500 according to the present embodiment. The microscope 500 includes an aberration correcting device 506. The aberration correcting device 506 has a similar construction to that of the aberration correcting device 6 described above, and includes a mirror device and a detector(s) for detecting a physical condition(s). Thus, the microscope 500 can provide similar effects to those of the optical information apparatus 101.

Light which has been reflected from the surface of a sample 501 which is placed on a sample stage 502 passes through an objective lens 503, a half mirror 504, and an eyepiece 505 so as to enter a pupil 509, whereby the sample is observed by eyesight. Moreover, a portion of the light having entered the half mirror 504 from the objective lens 503 is reflected by the half mirror 504, and enters the aberration correcting device 506, where its aberration is corrected. The light which has been subjected to aberration correction is converged by a converging lens 507, and imaged by a CCD camera.

Since the aberration correcting device 506 includes a detector(s) for detecting a physical condition(s), it is possible to perform feedback control for the component elements of the microscope 500 in accordance with changes in the physical condition(s) within the microscope 500. For example, by controlling the position of the sample stage 502 with a feedback signal that is generated from acceleration, angular velocity, and angular acceleration as detected by the detector(s), blurring of an observed image due to vibration, or shifting of an observation point during measurement can be prevented. In particular, since the field of view becomes narrower with higher magnification, it is important to prevent disturbances in an image which are caused by vibration.

Embodiment 17

Figure 22:
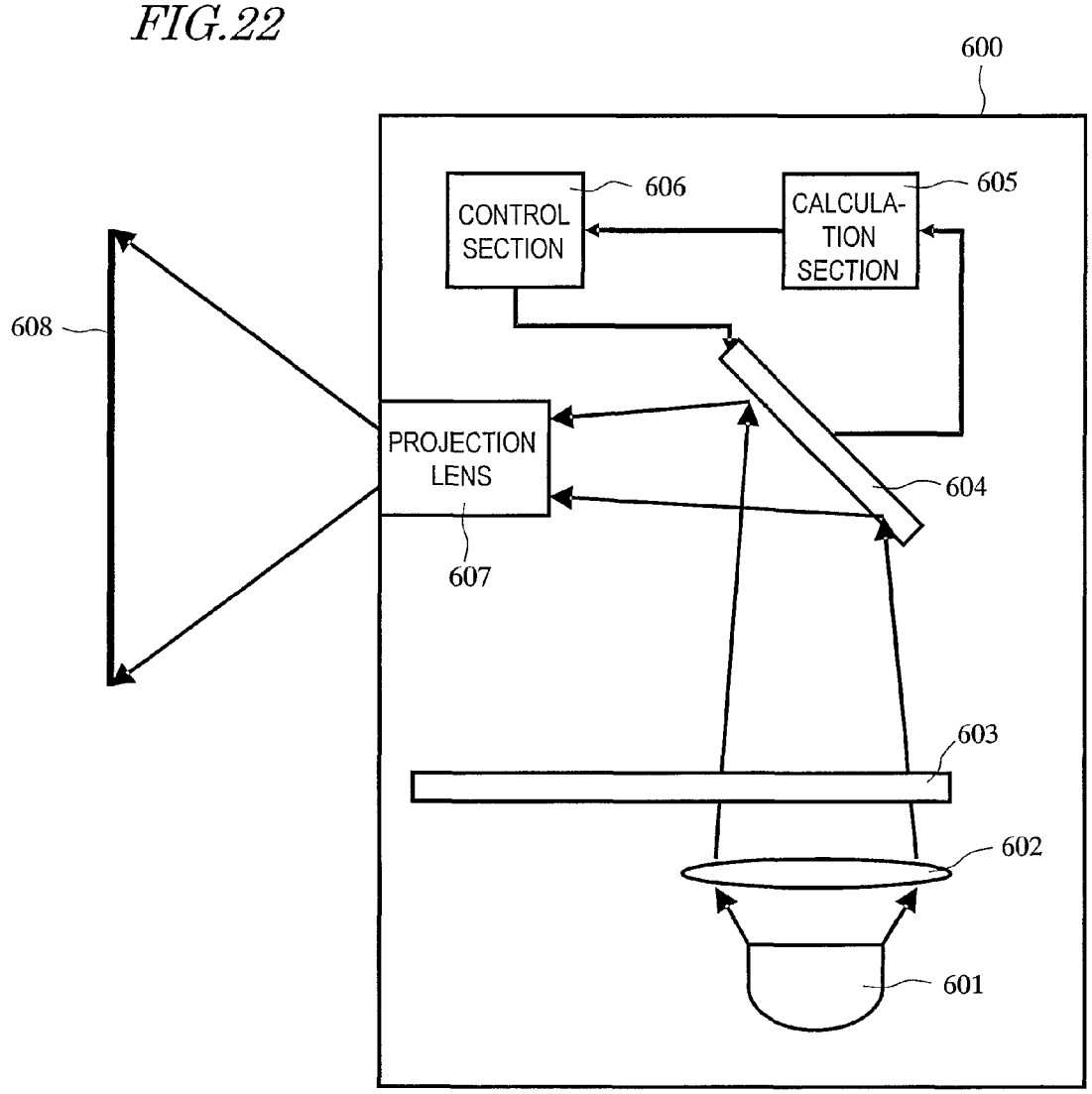
FIG. 22 A diagram showing an image projection apparatus according to an embodiment of the present invention.

FIG. 22 is a diagram showing an image projection apparatus 600 according to the present embodiment. The image projection apparatus 600 includes a spatial light modulation device 604. The spatial light modulation device 604 has a similar construction to that of the aberration correcting device 6 described above, and includes a mirror device and a detector(s) for detecting a physical condition(s). Thus, the image projection apparatus 600 can provide similar effects to those of the optical information apparatus 101.

Light which is radiated from a light source 601 passes through a converging lens 602 and a color filter 603, and enters the spatial light modulation device 604. In accordance with an image frame, the spatial light modulation device 604 reflects the light in the direction of a projection lens 607. The projection lens 607 magnifies the incident light, whereby a projection image 608 is obtained. Gravitational acceleration is detected from an amount(s) of displacement of a detector(s)

included in the spatial light modulation device 604. A calculation section 605 calculates an angle of tilt from the direction of gravitational acceleration, and the control section 606 performs feedback control for the spatial light modulation device 604 in accordance with the calculated angle of tilt, thus performing a trapezium distortion correction for the projection image. Whereas a conventional apparatus would have a separate tilt sensor mounted therein, the spatial light modulation device 604 detects gravitational acceleration so that cost reduction for the overall apparatus can be realized.

Note that, as is the case with the time division driving described with reference to FIG. 2, the light modulation operation and the operation of detecting an amount of displacement may be switched by time division also in the above-described image projection apparatus, camera, and microscope according to the present invention.

In the above description, a micromirror array, which will best exhibit the effects according to the present invention, is adopted as the aberration correcting device. However, it may be any device which has a good response and which allows aberration correction states to be set for respective regions. For example, similar effects can be obtained by providing an amount of displacement detection section in an aberration correcting device such as a liquid crystal device.

When an aberration correcting device according to the present invention is mounted in an optical head device, it becomes possible to generate a temperature signal, a humidity signal, an acceleration signal, an angular velocity signal, etc., from a change in capacitance of an aberration correcting device or an amount of displacement of a piezoelectric element. As a result, the number of individual detectors can be reduced, whereby downsizing, simplification of mechanism, and cost reduction can be realized in the optical head device.

As described above, an actuator according to the present invention is an actuator having an optical modulation section for modulating light, and is characterized in that the optical modulation section comprises: a base; a movable section having a light reflecting surface and being capable of displacement relative to the base; an elastic supporting member for supporting the movable section; a stationary electrode portion formed on the base so as to oppose the movable section; and a detection section for detecting a physical condition to which the actuator is subjected.

In one embodiment, the detection section is the movable section and the stationary electrode portion; and the physical condition is detected from an amount of displacement between the movable section and the stationary electrode portion.

In one embodiment, the physical condition is at least one of temperature, humidity, acceleration, angular velocity, angular acceleration, and pressure.

In one embodiment, the detection section is an acceleration sensor which is produced through a same process as a production process of the optical modulation section.

In one embodiment, the movable section is displaced by an electrostatic attraction occurring between the movable section and the stationary electrode.

In one embodiment, the detection section is disposed in at least a portion of the optical modulation section.

In one embodiment, the detection section is disposed in at least a portion of an outer periphery of the optical modulation section.

A production method according to the present invention is a method for producing an actuator in which an electrostatic attraction occurring between a movable electrode and a stationary electrode causes displacement of the movable section, and is characterized by comprising: a step of forming the stationary electrode on a base; a step of depositing a first sacrificial layer on the stationary electrode, and forming the movable electrode on the first sacrificial layer; a step of depositing a second sacrificial layer on the movable electrode; a step of, when forming in the second sacrificial layer a trench in which to deposit a material for forming a rib connecting the movable electrode to a mirror section, forming the trench so as to have a broader width in a portion than in other portions; and a step of depositing the material in the trench to form the rib and forming a weight in the portion having a broad width.

An optical head device according to the present invention is an optical head device comprising: a light source for outputting laser light; an optical system for allowing the laser light to be radiated onto an optical disk medium; and an aberration correction section for correcting an aberration of the laser light, and is characterized in that the aberration correction section includes: a plurality of mirror sections for reflecting the laser light; a plurality of mirror driving sections for displacing the plurality of mirror sections; and a detection section for detecting a physical condition within the optical head device.

In one embodiment, the detection section is at least one mirror driving section among the plurality of mirror driving sections.

In one embodiment, a driving signal generation section for generating a predetermined driving signal which is in accordance with the detected physical condition is further comprised.

In one embodiment, the physical condition is at least one of temperature, humidity, acceleration, angular velocity, angular acceleration, and pressure.

In one embodiment, by time division, the at least one mirror driving section switches between an operation of driving the at least one mirror section for aberration correction and an operation of detecting the physical condition.

In one embodiment, the mirror driving section includes a movable electrode portion and a stationary electrode portion which are apart from each other via a gap; and the mirror driving section causes the mirror section to be displaced by an electrostatic attraction occurring between the movable electrode and the stationary electrode.

In one embodiment, the mirror driving section includes a piezoelectric element; and the mirror section is displaced in accordance with a deformation of the piezoelectric element.

In one embodiment, the detection section is an acceleration sensor which is produced through a same process as a production process of the mirror driving section.

In one embodiment, the acceleration sensor includes a movable electrode portion and a stationary electrode portion which are apart from each other via a gap; and a distance between the movable electrode and the stationary electrode changes in accordance with an acceleration experienced by the optical head device.

In one embodiment, the aberration correction section includes: a base; a movable section having a light reflecting surface and being capable of displacement relative to the base; an elastic supporting member for supporting the movable section; and a stationary electrode portion formed on the base so as to oppose the movable section.

In one embodiment, the aberration correction section includes: a base; a movable section having a light reflecting surface and being capable of displacement relative to the base; an elastic supporting member for supporting the movable section; and a piezoelectric member for displacing the movable section.

An optical information apparatus according to the present invention is characterized by comprising: the aforementioned optical head device; a light source driving section for driving the light source; an objective lens mechanism driving section for driving an objective lens mechanism which controls a position of an objective lens included in the optical system; a traverse mechanism driving section for driving a traverse mechanism for transporting the optical head device along a radial direction of the optical disk medium; a rotation mechanism driving section for driving a rotation mechanism which rotates the optical disk medium; and a driving signal generation section for generating, in accordance with the detected physical condition, a driving signal for driving at least one of the light source driving section, the objective lens mechanism driving section, the traverse mechanism driving section, and the rotation mechanism driving section.

In one embodiment, the detection section is an acceleration sensor which is produced through a same process as a production process of the mirror driving section.

An optical information apparatus according to the present invention is an optical information apparatus comprising the aforementioned optical head device, and is characterized in that the optical information apparatus further comprises at least one of: a tilt mechanism driving section for driving a tilt mechanism for tilting at least one of an objective lens included in the optical system and the optical disk medium; an optical element mechanism driving section for driving an optical element mechanism for controlling a position of an optical element disposed in an optical path of the optical system; a collision prevention mechanism driving section for driving a collision prevention mechanism for preventing the objective lens from colliding against the optical disk medium; a loading mechanism driving section for driving a loading mechanism for loading the optical disk medium; and a cooling fan driving section for driving a cooling fan; and the optical information apparatus further comprises: a driving signal generation section for generating, in accordance with the detected physical condition, a driving signal for driving at least one of the tilt mechanism driving section, the optical element mechanism driving section, the collision prevention mechanism driving section, the loading mechanism driving section, and the cooling fan driving section.

In one embodiment, the detection section is an acceleration sensor which is produced through a same process as a production process of the mirror driving section.

An actuator according to the present invention is an actuator having an optical modulation section for modulating light, and is characterized in that the optical modulation section comprises: a base; a movable section having a light reflecting surface and being capable of displacement relative to the base; an elastic supporting member for supporting the movable section; a piezoelectric member for displacing the movable section; and a detection section for detecting a physical condition to which the actuator is subjected.

In one embodiment, the detection section is the piezoelectric member; and the physical condition is detected from a strain of the piezoelectric member.

In one embodiment, the physical condition is at least one of temperature, humidity, acceleration, angular velocity, angular acceleration, and pressure.

In one embodiment, the detection section is an acceleration sensor which is produced through a same process as a production process of the optical modulation section.

In one embodiment, the movable section is displaced by an electrostatic attraction occurring between the movable section and the stationary electrode.

In one embodiment, the detection section is disposed in at least a portion of an outer periphery of the optical modulation section.

A production method according to the present invention is a method for producing an actuator in which an electrostatic attraction occurring between a movable electrode and a stationary electrode causes displacement of the movable section, comprising: a step of forming the stationary electrode on a base; a step of depositing a sacrificial layer on the stationary electrode; a step of forming an elastic supporting member for supporting the movable electrode and the movable electrode on the sacrificial layer; and a step of forming a bimetal structure by depositing, on at least one of the movable electrode and the elastic supporting member, a material which is different from a material or materials of the movable electrode and the elastic supporting member.

INDUSTRIAL APPLICABILITY

The present invention is particularly useful in technological fields where aberration correction is performed.

The invention claimed is:

1. A microarray comprising a two-dimensional array of actuators, each actuator having:
   a base;
   a movable section capable of displacement relative to the base;
   an elastic supporting member for supporting the movable section; and
   a stationary electrode portion formed on the base so as to oppose the movable section, wherein,
   at least one of the actuators in the microarray disposed in a light-irradiated region includes an optical modulation section having a light reflecting surface for reflecting light on the movable section; and
   at least one of the actuators on the surface of the microarray disposed outside the light-irradiated region includes a detection section for detecting a physical condition from an amount of displacement between the movable section and the stationary electrode portion.

2. The microarray of claim 1, wherein the physical condition is at least one of temperature, humidity, acceleration, angular velocity, angular acceleration, and pressure.

3. The microarray of claim 1, wherein, the detection section is an acceleration sensor which is produced through a same process as a production process of the optical modulation section.

4. The microarray of claim 1, wherein, the movable section is displaced by an electrostatic attraction occurring between the movable section and the stationary electrode portion.

5. The microarray of claim 1, wherein at least one of the actuators disposed in a light-irradiated region includes the optical modulation section and the detection section.

6. An optical head device comprising:
   a light source for outputting laser light;
   an optical system for allowing the laser light to be radiated onto an optical disk medium; and
   an aberration correction section for correcting an aberration of the laser light, wherein,
   the aberration correction section includes a microarray comprising a two-dimensional array of a plurality of actuators;
   at least one of the plurality of actuators reflects the laser light; and
   the aberration correction section further includes a detection section for detecting a physical condition within the optical head device, wherein at least one of the actuators in the microarray disposed in a light-irradiated region includes an optical modulation section having a light reflecting surface for reflecting light; and the detection section is at least one of the actuators on the surface of the microarray disposed outside the light-irradiated region.

7. The optical head device of claim 6, wherein the detection section is at least one of the plurality of actuators.

8. The optical head device of claim 6, further comprising a driving signal generation section for generating a predetermined driving signal which is in accordance with the detected physical condition.

9. The optical head device of claim 6, wherein the physical condition is at least one of temperature, humidity, acceleration, angular velocity, angular acceleration, and pressure.

10. The optical head device of claim 7, wherein, by time division, the at least one actuator switches between an operation of driving at least one light reflecting surface for aberration correction and an operation of detecting the physical condition.

11. The optical head device of claim 6, wherein,
the actuator includes a movable electrode portion and a stationary electrode portion which are apart from each other via a gap; and
the actuator causes a light reflecting surface to be displaced by an electrostatic attraction occurring between the movable electrode portion and the stationary electrode portion.

12. The optical head device of claim 6, wherein,
the actuator includes a piezoelectric element; and
a light reflecting surface is displaced in accordance with a deformation of the piezoelectric element.

13. The optical head device of claim 6, wherein the detection section is an acceleration sensor which is produced through a same process as a production process of the actuator.

14. The optical head device of claim 13, wherein,
the acceleration sensor includes a movable electrode portion and a stationary electrode portion which are apart from each other via a gap; and
a distance between the movable electrode portion and the stationary electrode portion changes in accordance with an acceleration experienced by the optical head device.

15. The optical head device of claim 6, wherein the aberration correction section includes:
a base;
a movable section having a light reflecting surface and being capable of displacement relative to the base;
an elastic supporting member for supporting the movable section; and
a stationary electrode portion formed on the base so as to oppose the movable section.

16. The optical head device of claim 6, wherein,
the aberration correction section includes:
a base;
a movable section having a light reflecting surface and being capable of displacement relative to the base;
an elastic supporting member for supporting the movable section; and
a piezoelectric member for displacing the movable section.

17. An optical information apparatus comprising:
the optical head device of claim 6;
a light source driving section for driving the light source;
an objective lens mechanism driving section for driving an objective lens mechanism which controls a position of an objective lens included in the optical system;
a traverse mechanism driving section for driving a traverse mechanism for transporting the optical head device along a radial direction of the optical disk medium;
a rotation mechanism driving section for driving a rotation mechanism which rotates the optical disk medium; and
a driving signal generation section for generating, in accordance with the detected physical condition, a driving signal for driving at least one of the light source driving section, the objective lens mechanism driving section, the traverse mechanism driving section, and the rotation mechanism driving section.

18. The optical information apparatus of claim 17, wherein the detection section is an acceleration sensor which is produced through a same process as a production process of the actuator.

19. An optical information apparatus comprising the optical head device of claim 6, wherein,
the optical information apparatus further comprises at least one of:
a tilt mechanism driving section for driving a tilt mechanism for tilting at least one of an objective lens included in the optical system and the optical disk medium;
an optical element mechanism driving section for driving an optical element mechanism for controlling a position of an optical element disposed in an optical path of the optical system;
a collision prevention mechanism driving section for driving a collision prevention mechanism for preventing the objective lens from colliding against the optical disk medium;
a loading mechanism driving section for driving a loading mechanism for loading the optical disk medium; and
a cooling fan driving section for driving a cooling fan; and
the optical information apparatus further comprises:
a driving signal generation section for generating, in accordance with the detected physical condition, a driving signal for driving at least one of the tilt mechanism driving section, the optical element mechanism driving section, the collision prevention mechanism driving section, the loading mechanism driving section, and the cooling fan driving section.

20. The optical information apparatus of claim 19, wherein the detection section is an acceleration sensor which is produced through a same process as a production process of the actuator.

21. A microarray comprising a two-dimensional array of actuators, each actuator having:
a base;
a movable section capable of displacement relative to the base;
an elastic supporting member for supporting the movable section; and
a piezoelectric member for displacing the movable section, wherein,
at least one of the actuators in the microarray disposed in a light-irradiated region includes an optical modulation section having a light reflecting surface for reflecting light on the movable section; and
at least one of the actuators on the surface of the microarray disposed outside the light-irradiated region includes a detection section for detecting a physical condition from a strain of the piezoelectric member.

22. The microarray of claim 21, wherein at least one of the actuators disposed in a light-irradiated region includes the optical modulation section and the detection section.

23. The microarray of claim 21, wherein the physical condition is at least one of temperature, humidity, acceleration, angular velocity, angular acceleration, and pressure.

24. The microarray of claim 21, wherein,
the detection section is an acceleration sensor which is produced through a same process as a production process of the optical modulation section.

25. The microarray of claim 21, wherein,
the detection section is disposed in at least a portion of the optical modulation section.

26. The microarray of claim 21, wherein,
the detection section is disposed in at least a portion of an outer periphery of the optical modulation section.

* * * * *